US011580009B2

(12) United States Patent
Plawecki

(10) Patent No.: US 11,580,009 B2
(45) Date of Patent: Feb. 14, 2023

(54) SYSTEMS AND METHODS FOR PROGRAM CODE DEFECT AND ACCEPTABILITY FOR USE DETERMINATION

(71) Applicant: Daniel W. Plawecki, Melbourne, FL (US)

(72) Inventor: Daniel W. Plawecki, Melbourne, FL (US)

(73) Assignee: NORTHROP GRUMMAN SYSTEMS CORPORATION, Falls Church, VA (US)

( * ) Notice: Subject to any disclaimer, the term of this patent is extended or adjusted under 35 U.S.C. 154(b) by 64 days.

(21) Appl. No.: 17/183,956

(22) Filed: Feb. 24, 2021

(65) Prior Publication Data

US 2022/0269583 A1 Aug. 25, 2022

(51) Int. Cl.
*G06F 11/36* (2006.01)
*G06N 20/00* (2019.01)
*G06N 5/04* (2006.01)

(52) U.S. Cl.
CPC ...... *G06F 11/3664* (2013.01); *G06F 11/3676* (2013.01); *G06F 11/3684* (2013.01); *G06N 5/04* (2013.01); *G06N 20/00* (2019.01)

(58) Field of Classification Search
CPC ............. G06F 11/3664; G06F 11/3676; G06F 11/3684; G06N 20/00; G06N 5/04
See application file for complete search history.

(56) References Cited

U.S. PATENT DOCUMENTS

| 2015/0227449 | A1* | 8/2015 | Kuang | G06F 8/71 717/124 |
|---|---|---|---|---|
| 2017/0153969 | A1* | 6/2017 | Kshirsagar | G06F 11/3688 |
| 2017/0371629 | A1* | 12/2017 | Chacko | G06F 8/36 |
| 2020/0110693 | A1* | 4/2020 | Herrin | G06F 8/355 |
| 2021/0406003 | A1* | 12/2021 | Crabtree | G06Q 20/123 |

OTHER PUBLICATIONS

Atanas Atanasov et al. "A Toolkit For The Code Development In Advance Computing", [Online], pp. 1-20, [Retrieved from Internet on Dec. 2, 2022], <https://mediatum.ub.tum.de/doc/1145601/document.pdf> (Year: 2013).*

(Continued)

*Primary Examiner* — Ziaul A Chowdhury
(74) *Attorney, Agent, or Firm* — Tarolli, Sundheim, Covell & Tummino LLP

(57) ABSTRACT

A code development engine can be programmed to evaluate build code that can be representative of program code at an instance of time during or after a software development of the program code to identify and correct coding errors in the build code. A code run-time simulation engine can be programmed to simulate the build code in a modeled program code environment for the program code to identify and correct coding failures in the build code. A build code output module can be programmed to evaluate the build code to determine whether the build code is acceptable for use in a program code environment based on a level of acceptable risk for the build code in response to the coding error and/or coding failure being corrected in the build code.

17 Claims, 6 Drawing Sheets

(56) References Cited

OTHER PUBLICATIONS

Collin Irwin et al., "Automatic Simulation and Displa omatic Simulation and Display of Functions Within De unctions Within Developer Tools", [Online], pp. 1-9, [Retrieved from Internet on Dec. 2, 2022], <https://www.tdcommons.org/cgi/viewcontent.cgi?article=4729&context=dpubs_series> (Year: 2020).*
International Search Report for corresponding PCT/US2022/012663, dated Apr. 5, 2022.
Ldra SOFTWARE TECHNOLOGY: "Verification of Airborne Software in Compliance with DO-178C—Working with the Airborne Software Industry to Meet the Challenges of Achieving Cost-effective Certification"; Whitepapers of LORA Software technology, Jan. 1, 2017 (Jan. 1, 2017), Jan. 1, 2017 (Jan. 1, 2017), pp. 1-21, p. 055904812.
Vector: Complete Verification and Validation for DO-178C Whitepaper—V1.0 Oct. 2019 Whitepapers of VECTOR, Oct. 2019 (Oct. 1, 2019), pp. 1-20, XP055904811, Retrieved from the Internet: URL:https://cdn.vector.com/cms/content/know-how/aerospace/Documents/Complete_Verification_anc:LValidation_for_D0-178C.pdf [retrieved on Mar. 23, 2022]; the whole document.
Cho, et al.: "Towards Automated Safety Coverage and Testing for Autonomous Vehicles with Reinforcement Learning", arxiv.org, Cornell University Library, 201 Olin Library Cornell University Ithaca, NY 14853, May 22, 2020 (May 22, 2020),—May 22, 2020 (May 22, 2020), pp. 1-21, XP081684990; the whole document.
Lester: "Risk-based alternatives to the D0-178C software design assurance process", 2015 IEEE/AIAA 34TB Digital Avionics Systems Conference (DASC), IEEE, Sep. 13, 2015 (Sep. 13, 2015),—Sep. 13, 2015 (Sep. 13, 2015), XP032802066, DOI: 10.1109/DASC.2015.7311470 [retrieved on Oct. 28, 2015]; the whole document.

* cited by examiner

SYSTEMS AND METHODS FOR PROGRAM CODE DEFECT AND ACCEPTABILITY FOR USE DETERMINATION

TECHNICAL FIELD

The present disclosure relates to systems and methods program code defect and acceptability for use determination.

BACKGROUND

Software development is the process of conceiving, specifying, designing, programming, documenting, testing, and bug fixing involved in creating and maintaining applications, frameworks, programmable logic device micro-code), or other software components. Software development can include all that can be involved between conception of a desired software through to a final manifestation of the software, sometimes in a planned and structured process. Software development can include research, new development, prototyping, modification, reuse, re-engineering, maintenance, or any other activities that result in software products. In some instances, software development can include the addition of new features or functions to software and correction of discovered problems.

Program analysis is a process of analyzing the behavior of computer code, such as during development, regarding a property such as correctness, robustness, safety, liveness, and, in some instances, that a subject software is developed to an acceptable safety risk hazard. Program analysis focuses on program optimization and program correctness (e.g., ensuring that the program can operate in safety-critical systems). The first focuses on improving the program's performance while reducing the resource usage while the latter focuses on ensuring that the program does what it is supposed to do.

Machine learning (ML) is a subset of artificial intelligence (AI) in which a computer uses algorithms and statistical models to accurately perform tasks without using explicitly coded instructions after having analyzed a learning or training data set, in effect relying on patterns and inferences to generalize from past experiences. ML-based based systems can be capable of solving problems not previously seen or considered and for which it would not be possible to code for every individual case. Types of ML algorithms include, among others, supervised learning, unsupervised learning, and feature learning. Types of ML models that can be trained on the training data include artificial neural networks, decision trees, support vector machines, regression analysis models, Bayesian networks, genetic algorithms, principal components analysis, and cluster analysis.

SUMMARY

The present disclosure relates to systems and methods for program code defect and acceptability for use determination.

In an example, a system can include memory to store machine readable instructions and data. The data can include build code that can be representative of program code at an instance of time. The system can include one or more processors that can access the memory and execute the machine readable instructions. The machine readable instructions can include a code development engine, a code run-time simulation engine, and a build code output module. The code development engine can be programmed to evaluate the build code to determine whether the build code complies with a program code development standard for the program code to identify a coding error in the build code. The code development engine can be programmed to recommend an error corrective solution for correcting the build code for the coding error. The code run-time simulation engine can be programmed to simulate the build code in a modeled program code environment for the program code to identify a coding failure in the build code. The code run-time simulation engine can be programmed to recommend a failure corrective solution for correcting the build code for the coding failure. The build code output module can be programmed to evaluate the build code to determine whether the build code is acceptable for use in a program code environment based on a level of acceptable risk for the build code in response to the coding error and/or coding failure being corrected in the build code.

In another example, a computer-implemented method can include providing build code that can be representative of program code at an instance of time during a software development of the program code, evaluating the build code to identify a coding error in the build code based on a library of learned coding development standards characterizing rules and/or constraints for the software development of the program code, recommending an error corrective solution for correcting the coding error based on an evaluation of the coding error and a library of learned coding error solutions characterizing prior error corrective solutions for coding errors in program and/or build codes, updating the build code to correct the coding error in the build code based on the error corrective solution, and determining whether the build code is acceptable for use in a program code environment for the program code based on a level of acceptable risk for the build code in response to correcting the coding error in the build code.

In a further example, a computer-implemented method can include receiving build code that can be representative of program code at an instance of time during or after a software development of the program code, simulating the build code in a modeled program code environment of a program code environment for the program code to determine a behavior and/or performance of the build code, evaluating the behavior and/or performance of the build code to identify a coding failure in the build code, identifying a failure corrective solution for correcting the coding failure based on an evaluation of the coding failure and a library of learned coding failure solutions characterizing prior failure corrective solutions for coding failures in program and/or build codes, and determining whether the build code is acceptable for use in the program code environment based on a level of acceptable risk for the build code in response to correcting the coding failure in the build code.

DETAILED DESCRIPTION

Figure 1:
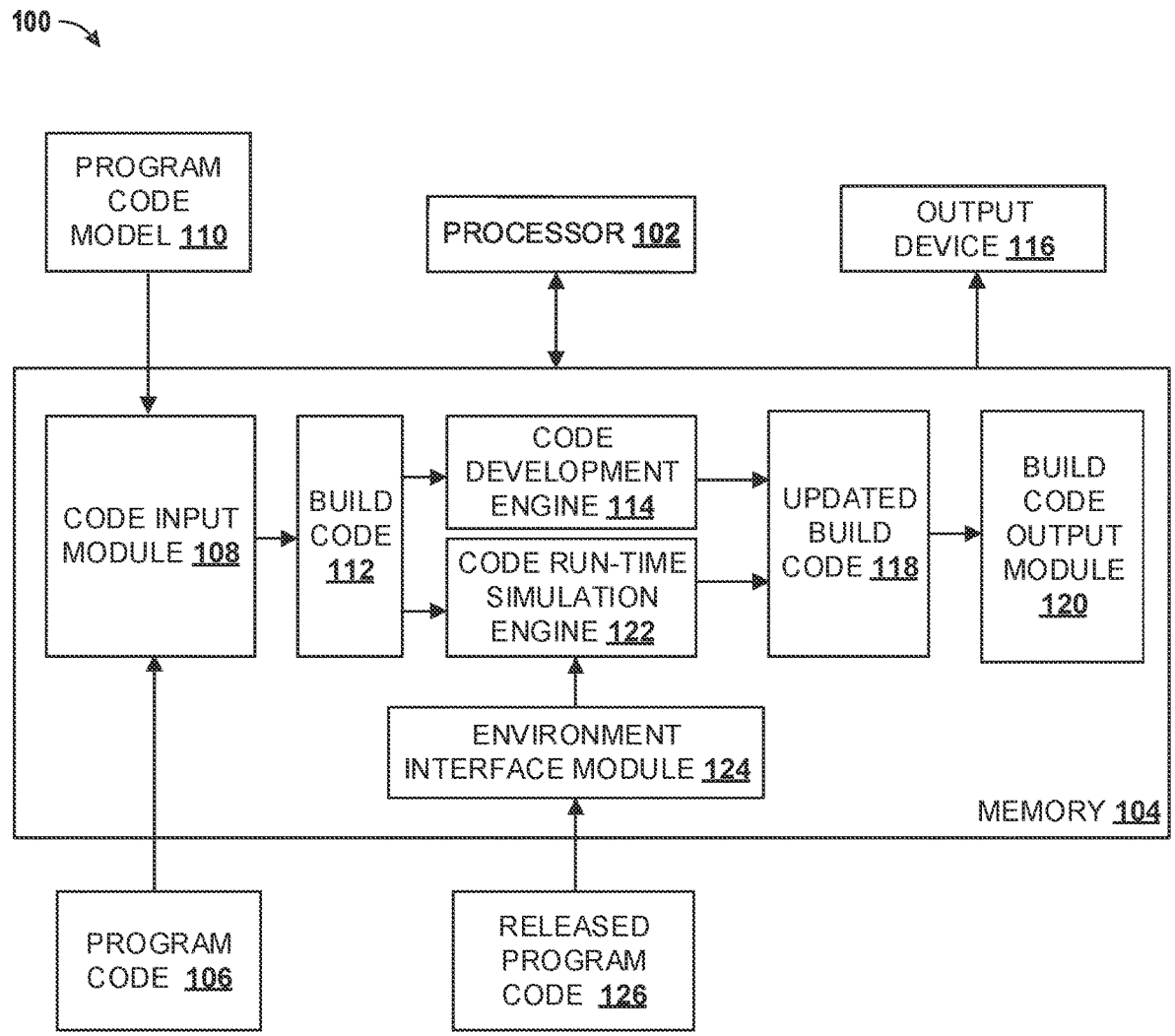
FIG. 1 illustrates an example of a system for program code defect and acceptability for use determination.

The present disclosure relates to systems and methods for program code defect and acceptability for use determination. Existing techniques for program code verification (or certification) rely on human subjective evaluation of software development evidence to determine whether the program code is acceptable for use in an intended system (e.g., such as a safety-critical system, a mission-critical system, a security-critical system, and the like). Program code verification involves using one or more practices, tests, and/or standards to determine the acceptability of program code. In some instances, program code verification can include evaluating artifacts (or evidence) for the program code (e.g., risk assessments (e.g., risks posed by the program code), a type of computing system that the program is to be executed on, use cases, unified modeling language (UML) diagrams, class diagrams, images used in developing the program code, software documents (e.g., documents that describe characteristics or attributes of the program code), meeting notes, prototypes, and the like).

Depending on a type of program and/or a corresponding computing environment in which the program code is to be used, different program code verification methodologies have been developed for program code acceptability evaluation to make a determination whether the program code is acceptable. Program code that has been identified (or flagged) as acceptable can correspond to program code that has been determined to comply with program code testing criteria (e.g., such as a given level of correctness, coding errors, safety, and/or reliability) and/or a defined software development standard. In some instances, program code verification involves using software testing tools and/or software metrics to determine whether the program code is acceptable for use. For example, in aerial vehicle applications, DO-178 (e.g., DO-178B or DO-178C) is employed to evaluate the program code for acceptability. The Federal Aviation Administration (FAA) applies DO-178 as an underlying baseline and guidance (e.g., standard) for verifying and determining whether safety critical program code will perform safe in an airborne environment.

However, the use of humans to evaluate quantities of evidence in connection with developing the program code and determining whether the program code is acceptable can result in superficial, incomplete, and/or unacceptably long evaluations. Furthermore, the use of humans for evaluation is time-consuming and subjective. Consequently, certification of software and/or programmable logic device microcode) as acceptable is time-consuming, analysis intensive, test intensive, documentation intensive, manpower-intensive, subjective to the evaluator's opinion, and can result in uncertainty with respect to whether the program code is acceptable (e.g., safe or not).

Furthermore, existing program code verification methodologies are not readily applicable to legacy program code as current evaluation methodologies are designed for newer program code development standards. For example, existing program code verification methods used to establish the program code as acceptable are based on a "stage-of-involvement" approach (or process). This means that certain assurances tasks must be executed at very specific points in a software development cycle. However, this is problematic for legacy code as the "stage-of-involvement" process results in a need to either re-write the legacy code or be forced to accept the legacy code "as is." Additionally, existing legacy code has poor documentation and thus re-engineering the legacy code is usually not a viable option.

Moreover, existing program code verification methodologies used for evaluating safety-critical program code employing ML and/or AI, are based on static software imaging techniques (e.g., deterministic program code testing techniques). As such, these methodologies are not capable of providing assurances that a new direction of self-modifying code seen in supervised and unsupervised environments, is acceptably safe for use as epics modify the code form an initial release of the program code. Additionally, existing program code verification methodologies require that the program code is completed (e.g., fully developed and ready for verification) and/or the evidence-based processes are completed (e.g., verification is fully completed to a sufficient level) before determining whether the program code is acceptable.

Systems and methods are described herein for evaluating program code during different stages of development (e.g., planning phase, analysis phase, design phase, implementation phase, and/or testing and integration phase) to determine whether the program code is acceptable and thus safe for use. The system and methods described herein can monitor a software development life cycle of the program code and determine (e.g., calculate) whether a current state or version of program code is acceptable for use (e.g., safe for use). As the computer program is being developed (e.g., one or more modules are being updated, improved, and the like), the systems and methods described herein can (e.g., continuously) monitor the development of the program code to identify defects (e.g., faults, errors, and failures) in the program code and quantify an acceptability of the program code corresponding to a value indicative of a level of safety for the program code. In some examples, the systems and methods described herein can be programmed to identify or provide recommendations to a user (e.g., a developer), or in some examples, provide suggestions for correcting the identified defects. Thus, as the user is developing the program code, the systems and methods described herein can notify the user of coding defects, and, in some examples, provide a solution for correcting the coding defects.

In some examples, a code development engine can be programmed to evaluate build code that can be representative of the program code at an instance of time during or after a software development of the program code to identify and correct coding errors in the build code. The code development engine can be programmed to evaluate the build code and provide recommendations for correcting the coding errors or update the build code to comply with a code development standard for the program code. The code development engine can be programmed to communicate with a build code output module that can be programmed to evaluate the build code to determine whether the build code is acceptable for use in a program code environment based on a level of acceptable risk for the build code in response to the coding error being corrected in the build code.

In some examples, a code run-time simulation engine can be programmed to simulate the build code in a modeled program code environment for the program code to identify and correct coding failures in the build code. The code run-time simulation engine can be programmed to receive the build code during and/or after the software development of the program code and process the build code to simulate a performance of the build code based on nominal, off-nominal, and stress conditions to identify a coding failure in the build code. The code run-time simulation engine can be programmed to evaluate the build code for determination by the build code output module as to whether the respective build of the program code is acceptable (e.g., safe for use). By way of further example, the code run-time simulation engine can be programmed to model a program code environment for the program code (e.g., in which the program code is to be used) and simulate the build code in the modeled program code environment to ascertain a behavior and/or performance of the build code (e.g., identify potential unsafe behaviors corresponding to actions of the build code to can lead to system failure and/or loss of human). The code development engine can be programmed to communicate with the build code output module that can be programmed to evaluate the build code to determine whether the build code is acceptable for use in the program code environment based on the level of acceptable risk for the build code in response to the failure error being corrected in the build code.

Accordingly, the systems and methods described remove the use of humans for subjective evaluation of quantities of evidence for program code verification and provide a deterministic approach for program code verification that allows for improved (e.g., faster) program code deployment. Moreover, the systems and methods described herein allow legacy program code to be verified to determine whether the legacy program code is acceptable. Furthermore, the system and methods described herein can be used to certify program code employing ML and/or AI algorithms to ensure that such program code is safe for use in a corresponding program application environment. Because the systems and methods described herein can evaluate the program code as the program code is being developed, the acceptability of the program code can be evaluated hand-in-hand with program code development, and thus does not require that the program code is fully developed (e.g., as currently required) before determining whether the program code is acceptable.

FIG. 1 illustrates an example of a system 100 for program code defect and acceptability for use determination. The system 100 can be implemented on a server, a cloud environment, a computer, such as a laptop computer, a desktop computer, a tablet computer, a workstation, a server, or the like. The system 100 can include one or more processors 102 and a memory 104. The memory 104 can store machine-readable instructions that can be retrieved and executed by the one or more processors 102 for program code evaluation and modification for acceptable use in a program code environment. The program code environment can correspond to a computing environment in which the program code is to be employed. By way of example, the computing environment can correspond to a computing system, such as employed on an aerial vehicle. Thus, in some examples, the system 100 can be used to determine whether the program code 106 complies with critical-safety application guidelines, such as defined by DO-178 and thus is acceptable for use (e.g., safe for use).

By way of example, the memory 104 can be implemented, for example, as a non-transitory computer storage medium, such as volatile memory (e.g., random access memory), non-volatile memory (e.g., a hard disk drive, a solid-state drive, a flash memory, or the like) or a combination thereof. The one or more processors 102 could be implemented, for example, as one or more processor cores. In the present example, although the components of the system 100 are illustrated as being implemented on the same system, in other examples, the components could be distributed across different systems (e.g., computers, devices, etc.) and communicate, for example, over a network (e.g., a wireless and/or wired network). In some examples, the system 100 can be implemented as a plugin and incorporated into a computer program (e.g., into a software application). As an example, the computer program can correspond to an integrated development environment (IDE). In other examples, the system 100 can be programmed to monitor one or more IDEs (e.g., software applications) and/or other software development tools as a developer or a group of developers collaborate to develop the program code 106.

In the example of FIG. 1, the memory 104 can include a code input module 108. In some examples, the code input module 108 can be programmed to receive or receive the program code 106 (e.g., a module, a software unit, a computer software configuration item (CSCI), micro-code, and/or the like) as the program code 106 is being developed. In other examples, as the program code 106 is being developed, the program code 106 can be represented by or as a program code model 110. For example, a software modeling tool can be employed to generate the program code model 110. The code input module 108 can be programmed to retrieve or receive the program code model 110. In some examples, the code input module 108 can be programmed to provide a build code 112 based on the program code model 110. In other examples, the build code 112 can correspond to the program code 106. In some examples, the program code 106 can include or correspond to legacy program code. By way of further example, the program code 106 can include ML and/or AI algorithms. In some examples, the system 100 can be employed to evaluate the respective build of the program code 106 during software development, such that the program code 106 can be deployed for early use in the program code environment.

In some examples, the build code 112 can correspond to a version of the program code 106 as the program code 106 is being developed by one or more users. Thus, in some examples, the program code model 110 can reflect changes or updates to the program code 106 during the development of the program code 106. As the program code 106 is being developed from an initial program code build to a final program code build (e.g., ready for use or certification) and thus, in some instances, into product quality code (e.g., program code that meets or satisfies requirements for use in a corresponding program code application, in some examples, referred to as released program code), the program code model 110 can be updated to reflect a corresponding program code build. Thus, as the program code 106 transitions and changes through its software development life, the program code model 110 can be updated to capture the transition and/or changes and thus describe the present version of the program code 106. As such, in some examples, as the program code 106 is being updated, the program code model 110 of the program code 106 can also be updated, which the code input module 108 can employ to update the build code 112. The build code 112 can be continuously updated by the code input module 108 to reflect updates to the program code 106 or the program code model 110. Accordingly, the build code 112 can be representative of a version of the program code 106 or the program code model 110 at an instance of time during the software development cycle.

In some examples, the memory 104 can include a code development engine 114 that can be programmed to evaluate the build code 112 to determine whether the program code 106 meets a code development standard for the program code 106. The code development engine 114 can be programmed to discover coding errors and faults (collectively referred to herein as "coding errors") in the program code 106 based on the evaluation of the build code 112 relative to the coding development standard. The code development engine 114 can be programmed to evaluate the build code 112 and provide recommendations for correcting the coding errors or update the build code 112 to comply with the code development standard for the program code 106.

For example, the code development engine 114 can be programmed to alert a user on an output device 116 (e.g., on a display) that the program code 106 contains a coding error, and provide a recommendation for correcting the coding error. By way of further example, if the coding error corresponds to a global variable conflict (e.g., a developer working on the program code 106 has used a given global variable value and a different developer working on the program code 106 has used the same global variable value), the alert can identify the global variable conflict, and a solution for correcting the global variable conflict (e.g., recommend using a different global variable value).

In other examples, the code development engine 114 can be programmed to update the build code 112 to correct the coding error to provide updated build code 118, thereby automatically correcting the build code 112. The updated build code 118 can be employed by a build code output module 120 stored in the memory 104 to update the program code model 110 or the program code 106. Thus, as the one or more coding errors are corrected by the code development engine 114, the build code output module 120 can be programmed to update the program code model 110 or the program code 106 to correct corresponding coding errors in the program code 106.

In some examples, the build code output module 120 can be programmed to evaluate the updated build code 118 to determine whether the respective build of the program code 106 is acceptable. A level of acceptable risk can be defined by the user and/or entity for the program code 106. In some examples, the level of acceptable risk can correspond to a safety risk for the program code 106. The build code output module 120 can be programmed to compute a risk probability (e.g., provide a confidence) for the updated build code 118 with respect to code use requirements. For example, safety code use requirements as defined by a corresponding standard can be employed for computing the risk probability. By way of example, the safety code use requirements can be provided based on a MIL-STD-882E standard (e.g., Software Hazard Risk in Table VI of the MIL-STD-882E standard relating to a degree of completion of applicable Level-of-Rigor tasks that have been completed). In some examples, the code use requirements can correspond to safety requirements or objectives for the program code 106. The safety requirements or objectives can be specified by one or more users, entities, and/or organizations. In some examples, the safety requirements or objectives can include an objective that the code must be designed to be fail-safe, all functional failures of the code must be detectable, and/or safety critical functions must be implemented using an arbitrated active/active redundant processing path.

The build code output module 120 can be programmed to evaluate the risk probability relative to the level of acceptable risk defined by the user and/or entity to determine whether the updated build code is acceptable. In some examples, the build code output module 120 can be programmed to alert the user on the output device 116 that the updated build code 118 is acceptable. In some examples, the build code output module 120 can be programmed to provide on the output device 116 the risk probability to indicate to the user a safety risk of the respective build of the program code 106. For example, the safety risk can be indicative that the updated build code 118 has achieved a state-of-assurance that there is adequate confidence that the updated build code 118 based on the level of acceptable risk. In some examples, the acceptability of the updated build code 118 can be application-specific, and thus the safety risk can be application-driven. By way of example, after simulating the build code 112 (e.g., by executing a plurality of simulations), and no functional anomalies have been detected, the safety risk can be indicative that the updated build code 118 has achieved a state-of-assurance.

In some examples, the memory can include a code run-time simulation engine 122. The code run-time simulation engine 122 can be executed concurrently with the code development engine 114 or post program code development. The code run-time simulation engine 122 can be programmed to simulate the build code 112 to discover coding failures (e.g., such as weakness, anomalies, defects, and/or the like) in the build code 112. The code run-time simulation engine 122 can be programmed to receive the build code 112 during a development life cycle of the program code 106 and process the build code 112 to simulate a performance of the build code 112 based on nominal, off-nominal, and stress conditions to identify a coding failure in the build code 112. The code run-time simulation engine 122 can be programmed to evaluate the build code 112 for determination by the build code output module 120 as to whether the respective build of the program code 106 is acceptable (e.g., safe for use). By way of further example, the code run-time simulation engine 122 can be programmed to model a program code environment for the program code 106 (e.g., in which the program code 106 is to be used) and simulate the build code 112 in the modeled program code environment to ascertain a behavior and/or performance of the build code 112 (e.g., identify potential unsafe behaviors corresponding to actions of the build code 112 to can lead to system failure and/or loss of human). In some examples, the modeled program code environment can include an operating system, an application layer, and a board support package.

In some examples, the code run-time simulation engine 122 can be programmed to communicate with the build code output module 120 in response to a given number of simulations of the build code 112. In some examples, after each simulation of the build code 112, the code run-time simulation engine 122 can be programmed to update the build code 112 by correcting the coding failure identified during each simulation to provide the updated build code 118. In further examples, the build code output module 120 can be programmed to employ the updated build code 118 to update the program code 106 and/or the program code model 110 to correct the failure in the program code 106. In some examples, the code run-time simulation engine 122 can be programmed to cause the build code output module 120 to compute the risk probability for the updated build code 118 as described herein. In some examples, the risk probability for the updated build code 118 can be computed after each simulation of the build code 112 and displayed on the output device 116 to provide the user with continuous updates as to the safety risk posed by the updated build code 118 corresponding to the respective build of the program code 106.

In some examples, the code development engine 114 and the code run-time simulation engine 122 can be configured to cooperate to provide the updated build code 118. For example, the code development engine 114 can be programmed to update the build code 112 to correct the coding error, and the code run-time simulation engine 122 can be programmed to update the build code 112 to correct for the coding failure. The system 100 can be configured to provide the updated build code 118 with the coding error and/or the coding failure (e.g., failure, error condition, undesirable behavior, and the like) corrected.

In some examples, the updated program code or the updated build code 118 can be employed in the program code environment. By way of example, the program code environment can correspond to a system, such as a computing system that may be part of a larger system, such as an aerial vehicle. Once deployed in the program code environment, the system 100 can employ an environment interface module 124 to receive an executed version of the updated program code or the updated build code 118. In some examples, a performance (e.g., behavior) of the updated program code or the updated build code 118 can change, such as in examples wherein the updated program code employs ML or AI algorithms. Because the performance of the updated program code can change as the updated program code or the updated build code 118 is being executed, the safety risk of the updated program code or the updated build code 118 can change.

The environment interface module 124 can be programmed to receive or retrieve an executed version of the updated program code or the updated build code 118 corresponding to a released program code 126. The environment interface module 124 can be programmed to provide the released program code 126 to the code run-time simulation engine 122 for simulation to determine whether the released program code 126 contains coding failures (e.g., failures that reduce an acceptability of the post release version of program code 126). In some examples, the environment interface module 124 can include a decompiler to convert the released program code 126 from machine code to a programming language code for processing by the code run-time simulation engine 122.

In some examples, the coding failures of the released program code 126 can be corrected by the code run-time simulation engine 122 to provide updated released program code in a same or similar manner as described herein with respect to the build code 112. The build code output module 120 can be programmed to evaluate the updated released program code in a same or similar as described herein with respect to the updated build code 118 to determine whether the updated released program code is acceptable for use (e.g., in the program code environment).

The build code output module 120 can be programmed to alert the user on the output device 116 whether the updated released program code is acceptable. The build code output module 120 can be programmed to employ the updated released program code to update the program code model 110 and/or the program code 106 to reflect the corrections of the one or more coding failures of the released program code 126 made by the code run-time simulation engine 122, for example, in response to a determination that the updated field program code is acceptable for use. In some examples, the build code output module 120 can be programmed to communicate with the computing system on which the release program code 126 is being stored for execution and update the released program code 126. Thus, in some examples, the system 100 can update the released program code 126 as the released program code 126 resides on the computing system (e.g., of the aerial vehicle) to correct the failures identified by the code run-time simulation engine 122.

In some examples, the build code output module 120 can be programmed to generate graphical user interface (GUI) data for displaying on the output device 116 performance parameters that can be aggregated to calculate and display a current confidence level corresponding to the risk probability that the updated build code 118 can achieve an acceptably safe CSCI at an acceptable risk. The performance parameters can be computed by the system 100, such as based on performance data provided by each of the code development engine 114 and/or the code run-time simulation engine 122 as these engines are being executed.

The type of performance parameters displayed on the output device 116 can be based on a corresponding build or program code, and/or application in which such code is to be employed. For example, the performance parameters can include a number of successful simulations (e.g., implemented by the code run-time simulation engine 122), distribution of nominal and off-nominal simulations, number of defects discovered in the build code 112, type of defects in the build code 112, decision points that require user input (e.g., to eliminate dead code or to retain decode but prove no jump into the dead code) with respect to the build code 112, assessment of risk that the build code 112 will execute as specified, assessment of risk that the build code 112 will not execute as specified or generate a hazardous or dangerous situation, an estimate of an amount of time that may be required to achieve the user-defined level of risk, and/or hazard risk drivers (e.g., memory constraints, throughput, excessive dead code, excessive code standard violations, and the like. Additionally, the build code output module 120 can be programmed to display on the output device 116 assurance compliance metrics at different levels of code development, including a unit level, a computer software unit level, and a computer software configuration unit (CSCU). As such, individual users or teams can visualize the safety performance metrics indicating confidence at any specific code that an individual or a team is assigned to develop.

Accordingly, the system 100 can be employed to evaluate the program code 106 during different stages of development (e.g., planning phase, analysis phase, design phase, implementation phase, and/or testing and integration phase) to verify or certify that the program code 106 is acceptable (e.g., safe for use). The system 100 can be configured to evaluate the program code 106 for coding errors and correct the coding errors or alert the user on the output device 116 as to the coding errors, and in some examples provide solutions for correcting the codding errors. In some examples, the system 100 can be configured to simulate the program code 106 during or after program code development to identify coding failures in the program code 106. The system 100 can be configured to correct the coding failures or alert the user on the output device 116 as to the coding failures, and in some examples provide solutions for correcting the coding failures.

Accordingly, the system 100 enables users to evaluate at any time during the development the program code 106 for acceptability (e.g., safety risk). As such, the user at any time can field a subject target computer software configuration item (CSCI) during development. Thus, the system 100 allows for incremental quantitative assessment of real-time program code. As such, the system 100 can reduce software certification times (e.g., to deterministically quantify the confidence that code will executed as intended in a safe manner) and costs, improve accuracy and confidence that program code is acceptable, reduce an amount of time for re-certification of program code after changes and/or modifications, certify legacy code as acceptable, and certify program code employing ML/AI technologies.

Figure 2:
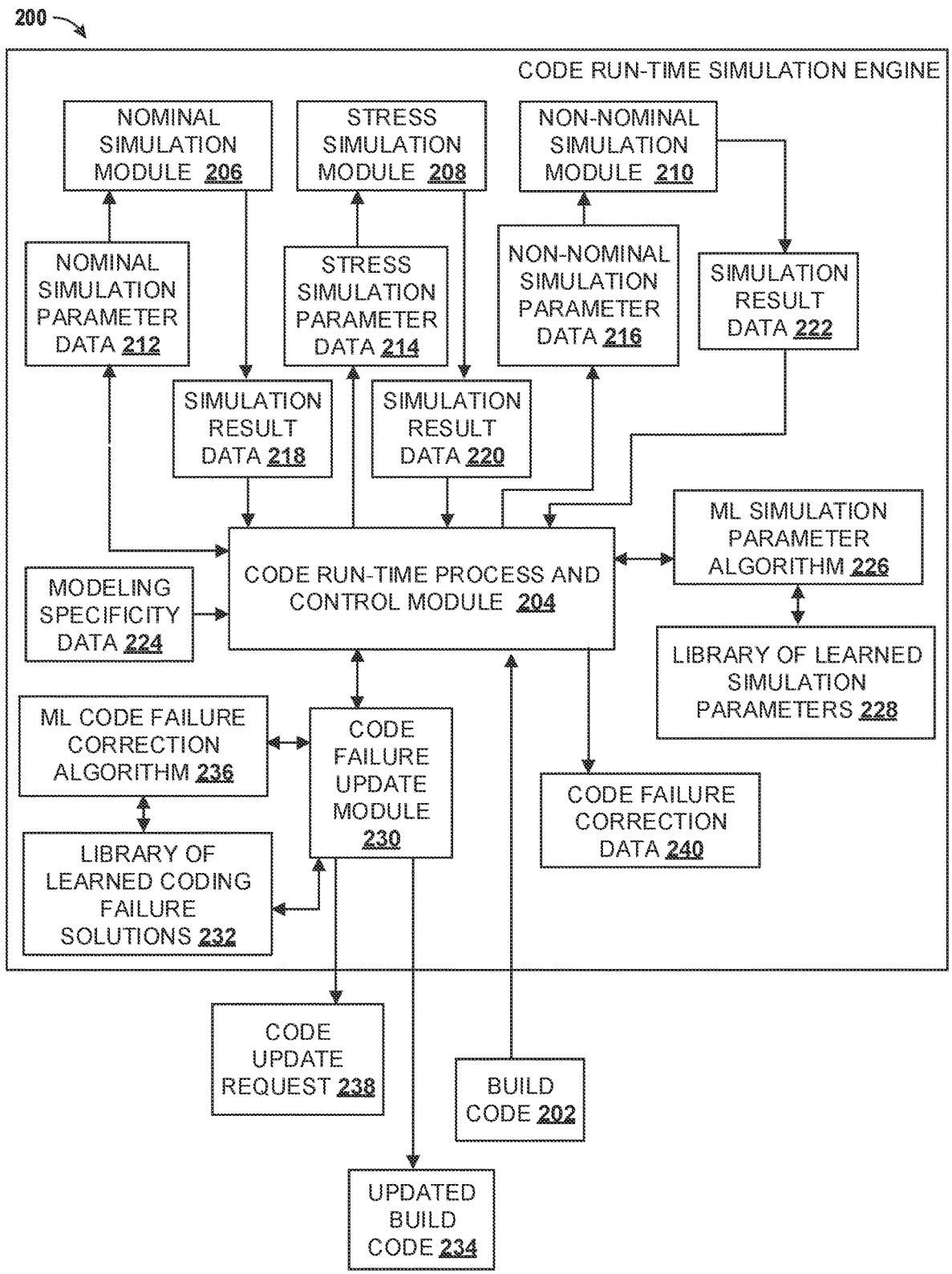
FIG. 2 illustrates an example of a code run-time simulation engine.

FIG. 2 illustrates an example of a code run-time simulation engine 200. In some examples, the code run-time simulation engine 200 can be employed in the system 100, and thus can correspond to the code run-time simulation engine 122, as illustrated in FIG. 1. Therefore, in some examples, reference can be made to the example of FIG. 1 in the following description of the example of FIG. 2. The code run-time simulation engine 122 can be programmed to simulate a build code 202 (e.g., the build code 112, as illustrated in FIG. 1) to discover code failures (e.g., such as weakness, anomalies, defects, and/or the like) in the build code 202 corresponding to a respective build of the program code 106. The code run-time simulation engine 200 can be programmed to receive the build code 202 during or after a development life cycle of the program code and process the build code 202 to simulate a performance of the build code 202 based on nominal, off-nominal, and stress conditions for determining an acceptability of the program code 106.

In some instances, it is desirable that the program code 106 is readily available for use, however, the program code 106 may have not been formally certified (e.g., via existing evidence-based processes for program code certification) and thus it is unknown how acceptable and thus safe the program code is for use in a respective program code environment. Users, entities and/or organizations may be unwilling of employing non-certified program code in certain computing systems due to legal risks that such program code may pose to the user and/or entities, or due to the lack of assurance that the non-certified program code is safe for use. For example, in some commercial and military flight applications, it may be desirable to employ the program code 106 before formal certification of the program code 106 as acceptable and thus safe for use in a safety-critical system. However, because a user or entity has no level of assurance that the program code 106 is acceptable until the program code 106 has been formally certified according to existing program code certification standards, which is time-consuming and a subjective process, it is not possible to employ the program code 106 in a corresponding flight application (e.g., in a warfighter) until the formal certification process is complete.

To overcome these challenges, the code run-time simulation engine 200 can be employed to evaluate the program code 106 before and/or during the formal certification process to determine whether the respective build of the program code 106 is acceptable. The code run-time simulation engine 200 can be programmed to simulate the build code 202 for determining whether the respective build of the program code 106 complies with a level of acceptable risk that has been defined for the program code 106. Thus, the code run-time simulation engine 200 can be programmed to provide a level of assurance that the program code 106 complies with an amount of risk that the user and/or entity has determined is permitted. Accordingly, the user and/or entity can readily employ the respective build of the program code 106 in the program code application, such as an aerial application, while being assured that the respective build of the program code 106 is acceptable, and thus safe for use (e.g., will not cause a failure that results in harm to property and/or human life).

In some examples, the code run-time simulation engine 200 can include a code run-time process and control (CRC) module 204. The CRC module 204 can be programmed to control a nominal simulation module 206, a stress simulation module 208, and a non-nominal simulation module 210 to simulate (e.g., a real-time) performance of the build code 202. Each module 206, 208, and 208 can be programmed to model a respective program code environment for simulating the build code 202 to evaluate a behavior and/or performance of the build code 202. In some examples, a number of simulations for each of the modules 206, 208, and 210 can be determined by the CRC module 204 (e.g., based on user input information at an input device). In further examples, a type of simulation for the build code 202 can be determined by the CRC module 204.

By way of example, the CRC module 204 can be programmed to provide the build code 202 to each of the simulation modules 206, 208, and 210 for simulation of the build code 202, and thus the respective build of the program code 106. Each simulation module 206, 208, and 210 can be programmed to simulate the build code 202 in a respective simulation environment (e.g., a modeled program code environment in which the program code 106 is to be used or is being used) to determine or identify coding failures in the build code 202. The respective simulation environment modeled by each simulation module 206, 208, and 210 can be based on respective simulation parameter data 212, 214, and 216. The respective simulation environment can correspond to a target or an intended environment in which the program code 106 is to be employed. For example, if the program code 106 is to be used in a safety-critical system (e.g., such as on an aircraft, a car, a weapons systems, medical device, nuclear power plant, etc.), the simulation modules 206, 208, and 210 can model the safety-critical system and simulate the build code 202 in the modeled safety-critical system. Each of the simulation modules 206, 208, and 210 can be programmed to generate simulation result data 218, 220, and 222.

By way of example, the simulation result data 218, 220, and 22 can include a number of successful simulations, distribution of nominal and off-nominal simulations, number of defects discovered, type of defects, decision points that require user input (e.g., to eliminate dead code or to retain decode but prove no jump into the dead code) with respect to the build code 202, assessment of risk that the build code 202 will execute as specified, assessment of risk that the build code 202 will not execute as specified or generate a hazardous or dangerous situation, an estimate of an amount of time that may be required to achieve a user-defined level of risk, and/or hazard risk drivers (e.g., memory constraints, throughput, excessive dead code, excessive code standard violations, and the like. The simulation result data 218, 220, and 222 can be provided to the CRC module 204.

The CRC module 204 can be programmed to evaluate the simulation result data 218, 220, and 222 to identify coding failures in the build code 202, thereby the respective build of the program code 106. For example, as the build code 302 is exposed to run-time conditions (e.g., simulated by the modules 206, 208, and/or 210), the CRC module 204 can be programmed to monitor run time conditions and predict potential anomalies based on the simulation result data 218, 220, and 22. By way of example, during the run time, if it is discovered that variable updates are slow or stale, then the CRC module 204 can be programmed to identify an anomaly corresponding to a coding failure and a cause of the anomaly (e.g., the slow or stale variable updates). In some examples, the CRC module 204 can be programmed to one of automatically correct the identified anomaly or request that the user correct the identified anomaly. In some examples, if the reason for slow or stale variable updates is because an update task is set to a low priority, the CRC module 202 can be programmed (e.g., based on learned history similar to a human) can recommend a higher priority for the update task, such as based on recommendations from a coding failure update module 230 as described herein.

In some examples, a modeling resolution can be specified based on modeling specificity data 224. The modeling specificity data 224 can identify a level of modeling detail for modeling the respective simulation environment, which can drive the one or more coding failures identified by the CRC module 204. Thus, in some examples, a resolution level of the modeled simulation environment can be based on the modeling specificity data 224. By way of example, if the modeling specificity data 224 indicates that an environment control system (ECS) of an aircraft is not be modeled in verifying the build code 202 in an aerial vehicle environment, at least one simulation module 206, 208, and 210 can be programmed to model an aerial vehicle environment with a safety-critical system for executing the program code without the ECS. In some examples, each of the simulation modules 206, 208, and 210 can be programmed to model its respective simulation environment according to a different degree of specificity based on the modeling specificity data 224.

In some examples, the CRC module 204 can be programmed to cause the simulation modules 206, 208, and 210 to simulate the build code 202 in a sequential or loop configuration and following each module simulation correct the one or more coding failures identified by a respective simulation module before a subsequent module simulation. For example, if the CRC module 204 identifies a first set of coding failures in the build code 202 based on the simulation result data 218 provided by the nominal simulation module 206, the first set of failures in the build code 202 can be corrected before simulation of the build code 202 by the stress simulation module 208. In some examples, if the CRC module 204 identifies a second set of failures in the build code 202 based on the simulation result data 220 provided by the stress simulation module 208, the second set of failures in the build code 202 can be corrected before simulation of the build code 202 by stress simulation module 206. In further examples, if the CRC module 204 identifies a third set of failures in the build code 202 based on the simulation result data 222 provided by the non-nominal simulation module 210, the third set of failures in the build code 202 can be corrected before simulation of the build code 202 by the nominal simulation module 206 in a same or similar manner as described herein.

By way of example, the nominal simulation module 206 can be programmed to simulate the build code 202 in the respective modeled environment based on the nominal simulation parameter data 212. The nominal simulation parameter data 212 can be provided by an ML simulation parameter algorithm 226. The ML simulation parameter algorithm 226 can be programmed to provide (e.g., recommend) simulation parameters for each module 206, 208, and 210 to configure respective simulation environments for simulation of the build code 202. The ML simulation parameter algorithm 226 can be trained based on simulation parameter training data.

In some examples, the nominal simulation parameter data 212 can include nominal condition data and/or parameters for modeling the respective environment according to nominal conditions (e.g., normal operating conditions for the program code) in which the program code is to be simulated. In some examples, the nominal simulation parameter data 212 can characterize elements of the respective environment (e.g., an aerial vehicle application), such that the elements of the system are operating as designed, and operational and environmental factors are as planned and forecasted.

In some examples, the ML simulation parameter algorithm 226 can be programmed to determine the nominal simulation parameter data 212 based on a library of learned simulation parameters 228. The library of learned simulation parameters 228 can correspond to a library of developed simulation parameter knowledge based on previous simulation results. Thus, the library of learned simulation parameters can characterize prior simulation parameters (e.g., previous nominal, stress, and/or non-nominal simulation parameters) for configuring parameters of modeled program code environments and simulation result data (e.g., whether the previous simulation parameters recommended by the ML simulation parameter algorithm 226 resulted in coding failures in the simulated program code).

Following each simulation (e.g., epic) by the nominal simulation module 206 based on the nominal simulation parameter data 212, the CRC module 204 can be programmed to store the simulation result data 218 and the nominal simulation parameter data 212 as part of the library of learned simulation parameters 228, such that for a subsequent simulation, the ML simulation parameter algorithm 226 can provide updated nominal simulation parameter data. Thus, following each simulation, the CRC module 204 can be programmed to associate each identified failure with the nominal simulation parameter data 212 and store the association in or as part of the library of learned simulation parameters 228, such that the ML simulation parameter algorithm 226 can be re-enforced via unsupervised learning.

The ML simulation parameter algorithm 226 can be programmed to employ the re-enforced library of learned simulation parameters for a subsequent determination (e.g., recommendation) of simulation parameters, which can be provided by the CRC module 204 as updated nominal simulation parameter data to the nominal simulation module 206. The nominal simulation module 206 can be programmed to model the respective environment based on the updated nominal simulation parameter data to simulate the build code 202 to determine whether additional coding failures exist in the build code 202. The additional failures, if discovered (e.g., by the CRC module 204), can be processed in a same or similar manner as described herein. Thus, subsequent simulations at the nominal simulation module 206 can be modified based on previous learned events, such that the ML simulation parameter algorithm 226 can be programmed to identify nominal simulation parameters that are more likely to lead to further coding failures in the build code 202 at the nominal simulation module 206.

By way of further example, the stress simulation module 208 can be programmed to simulate the build code 202 in the respective modeled environment based on the stress simulation parameter data 214. The stress simulation parameter data 214 can be provided by the ML simulation parameter algorithm 226. The stress simulation parameter data 214 can correspond to stress condition data and/or parameters (e.g., stress tests for creating different scenarios through which can be increased and monitored to ensure that timing requirements are still preserved for respective code) for modeling the respective environment according to stress impacting conditions in which the build code 202 is to be simulated. In some examples, the stress simulation parameter data 214 can characterize stress conditions that can act in the respective environment, some of which that can impact the performance or behavior of the build code 202.

In some examples, the ML simulation parameter algorithm 226 can be programmed to determine the stress simulation parameter data 214 based on the library of learned simulation parameters 228. Following each simulation (e.g., epic) by the stress simulation module 208 based on the stress simulation parameter data 214, the CRC module 204 can be programmed to store the simulation result data 220 as part of the library of learned simulation parameters 228, such that for a subsequent simulation, the ML simulation parameter algorithm 226 can provide updated stress simulation parameter data. Thus, following each simulation, the CRC module 204 can be programmed to associate each identified failure with the stress simulation parameter data 214 and store the association in or as part of the library of learned simulation parameters 228, such that the ML simulation parameter algorithm 226 is re-enforced via unsupervised learning.

The ML simulation parameter algorithm 226 can be programmed to employ the re-enforced library of learned simulation parameters for a subsequent determination (e.g., recommendation) of stress simulation parameters, which can be provided by the CRC module 204 as updated stress simulation parameter data to the stress simulation module 208. The stress simulation module 208 can be programmed to model the respective environment based on the updated stress simulation parameter data to simulate the build code 202 to determine whether additional coding failures exist in the build code 202. The additional coding failures, if discovered (e.g., by the CRC module 204), can be processed in a same or similar manner as described herein. Thus, subsequent simulations at the stress simulation module 208 can be modified based on previous learned events, such that the ML simulation parameter algorithm 226 can be programmed to select or identify stress simulation parameters that are more likely to lead to further failures in the build code 202.

By way of further example, the non-nominal simulation module 210 can be programmed to simulate the build code 202 in the respective modeled environment based on the non-nominal simulation parameter data 216. The non-nominal simulation parameter data 216 can be provided by the ML simulation parameter algorithm 226. The non-nominal simulation parameter data 216 can correspond to off-nominal data and/or parameters for modeling the respective environment according to random conditions that may impact the build code 202 during simulation. In some examples, the non-nominal simulation parameter data 216 can characterize elements of the respective environment (e.g., the aerial vehicle application), such that the elements of the system are operating as designed, but operational and environmental factors are not as planned or forecasted. For example, the off-nominal data and/or parameter can correspond to a negative attitude, if simulations result in a finding of a negative attitude, then the code-run time simulation engine 200 can flag this as an off-nominal condition. Initial rules for what is Off-Nominal or Non-Nominal can be generated based on the library of learned simulation parameters 228. However, as the code-run time simulation engine 200 is exposed to more and more simulations where reports are provided to the user, as the user defines additional off-nominal conditions, the code-run time simulation engine 200 can learn from this experience. Therefore, the code-run time simulation engine 200 can conclude that if a negative altitude is an anomaly, then a negative airspeed must also be an anomaly, and a negative compass heading must also be an off-nominal anomaly.

In some examples, the ML simulation parameter algorithm 226 can be programmed to determine the non-nominal simulation parameter data 216 based on the library of learned simulation parameters 228. Following each simulation (e.g., epic) by the non-nominal simulation module 210 based on the non-nominal simulation parameter data 216, the CRC module 204 can be programmed to store the simulation result data 222 as part of the library of learned simulation parameters 228, such that for a subsequent simulation, the ML simulation parameter algorithm 226 can be programmed to provide updated non-nominal simulation parameter data. Thus, following each simulation, the CRC module 204 can be programmed to associate each identified failure with the non-nominal simulation parameter data 216 and store the association in or as part of the library of learned simulation parameters 228, such that the ML simulation parameter algorithm 226 is re-enforced via unsupervised learning.

In some examples, the ML simulation parameter algorithm 226 can be programmed to employ the re-enforced library of learned simulation parameters for a subsequent determination (e.g., recommendation) of non-nominal simulation parameters, which can be provided by the CRC module 204 as updated non-nominal simulation parameter data to the non-nominal simulation module 210. The non-nominal simulation module 210 can be programmed to model the respective environment based on the updated non-nominal simulation parameter data to simulate the build code 202 to determine whether additional coding failures exist in the build code 202. The additional failures, if discovered (e.g., by the CRC module 204), can be processed in a same or similar manner as described herein. Thus, subsequent simulations at the non-nominal simulation module 210 can be modified based on previous learned events, such that the ML simulation parameter algorithm 226 can be programmed to select or identify non-nominal simulation parameters that are more likely to lead to further coding failures in the build code 202 at the non-nominal simulation module 210.

Although in the examples described herein a single ML simulation parameter algorithm and corresponding library of learned simulation parameters are employed for simulation parameter recommendation, in other examples, a respective ML simulation parameter algorithm and library can be employed for each simulation module 206, 208, and 210. Thus, in some examples, a first ML simulation parameter algorithm and a first library of learned simulation parameters can be employed to provide the nominal simulation parameter data 212 for the nominal simulation module 206, a second ML simulation parameter algorithm and a second library of learned simulation parameters can be employed to provide the stress simulation parameter data 214 for the stress simulation module 208, and a third ML simulation parameter algorithm and a third library of learned simulation parameters can be employed to provide the non-nominal simulation parameter data 216 for the non-nominal simulation module 210.

In some examples, if at least one failure is discovered by the CRC module 204 based on respective simulation result data 218, 220, or 222, the CRC module 204 can be programmed to communicate with a code failure update (CFU) module 230. In some examples, the CFU module 230 can be programmed to communicate with a library of learned coding failure solutions 232. The library of learned coding failure solutions 232 can correspond to a library of developed code update knowledge. Thus, the library of learned coding failure solutions 232 can characterize previous code failure solutions (e.g., corrections, changes, modifications, and the like) implemented by the CFU module 230. The library of learned coding failure solutions 232 can identify one or more previous coding failures in one or more previous build codes (e.g., associated with the program code 106 or other program codes, the build code 202, and/other build codes) and associated updates (e.g., solutions) to implement to correct a discovered failure.

The CFU module 230 can be programmed query the library of learned coding failure solutions 232 based on the discovered failure to identify a failure corrective solution for correcting the discovered failure. The CFU module 230 can be programmed to update the build code 202 to correct the discovered failure based on the failure corrective solution to provide updated build code 234. Accordingly, in some examples, discovered failures in the build code 202 can be updated by the CFU module 230 based on the library of learned coding failure solutions 232. In some examples, if the discovered failure is a new failure and thus not identified by the library of learned coding failure solutions 232, the CFU module 230 can be programmed to alert the user on the output device 116 (e.g., on a display that the user can access) for manual correction of the discovered failure.

By way of further example, the library of learned coding failure solutions 232 can be in communication with an ML code failure correction (ML-CFC) algorithm 236. In some examples, the ML-CFC algorithm 236 can include the library of learned coding failure solutions 232. The ML-CFC algorithm 236 can be programmed to identify corrections (e.g., solutions) for coding failures in the build code 202 based on library of learned coding failure solutions 232. In some examples, the ML-CFC algorithm 236 can be programmed to identify the failure corrective solution for correcting the discovered failure based on the library of learned coding failure solutions 232 to provide the updated build code 234.

In some examples, following a respective simulation by a corresponding simulation module 206, 208, and 210, the CFU module 230 can be programmed to provide the updated build code 234 to the CRC module 204 for subsequent simulation by the corresponding simulation module 206, 208, and 210 or a different simulation module 206, 208, and 210. In some examples, the CRC module 204 can be programmed to evaluate corresponding simulation result data 218, 220, and 222 to determine whether the coding failure has been corrected. The CFU module 230 can be programmed to update the library of learned coding failure solutions 232 to re-enforce via unsupervised learning the ML-CFC algorithm 236 based on the evaluation of whether the failure has been corrected based on the failure corrective solution. In some examples, following the respective simulation by the corresponding simulation module 206, 208, and 210, the CFU module 230 can be programmed to provide the updated build code 234 to the CRC module 204 for subsequent simulation by the corresponding simulation module 206, 208, and 210 or the different simulation module 206, 208, and 210. As such, the build code 202 can be updated to correct for coding failures, and the updated build code 234 can be simulated by the corresponding simulation module 206, 208, and 210 for additional coding failures based on the updated simulation parameters provided by the ML simulation parameter algorithm 226.

In some examples, the CFU module 230 can be programmed to generate a code update request 238. The code update request 238 can identify the discovered failure. The code update request 238 can be provided to the user (e.g., on the output device 116) for manual updating (e.g., correction) of the build code 202 to provide the updated build code 234. For example, the CFU module 230 can include a GUI generator that can be programmed to provide GUI output data with the code update request 238 on the output device 116. The GUI output data can include elements that the user can interact with for correcting the discovered failure.

In some examples, the CRC module 204 can be programmed to generate code failure correction result data 240. The code failure correction result data 240 can be indicative of types of coding failures and a number coding failures corrected and/or uncorrected in the build code 202. The CRC module 204 can be programmed to communicate the code failure correction result data 240 to the build code output module 120 for further processing, such as determining an acceptability of the updated build code 234 and thereby the program code 106. Accordingly, the code runtime simulation engine 200 can be programmed to correct coding failures in program code 106 during or after software development of the program code 106.

Figure 3:
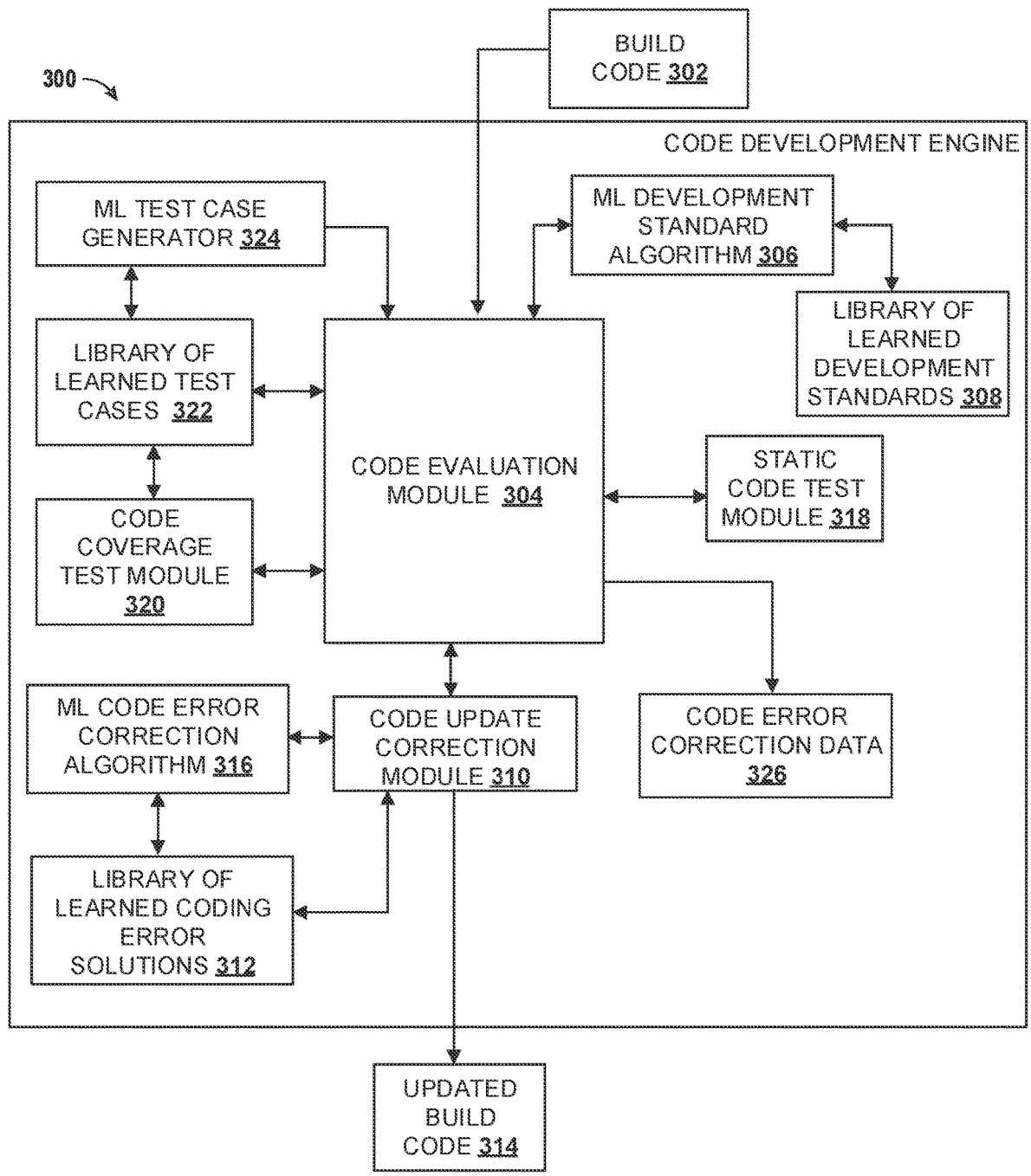
FIG. 3 illustrates an example of a code development engine.

FIG. 3 illustrates an example of a code development engine 300. In some examples, the code development engine 300 can be employed in the system 100, and thus can correspond to the code development engine 114, as illustrated in FIG. 1. Therefore, reference can be made to the example of FIGS. 1-2 in the following description of the example of FIG. 3. The code development engine 300 can be programmed to evaluate the program code 106 during development to determine whether the program code 106 meets a development standard defined for the program code 106. Thus, based on the program code application (e.g., whether the program code 106 is to be used in a safety-critical environment, such as an aerial vehicle, a security-critical environment, such as a banking system, etc.), the code development engine 300 can be programmed to evaluate the program code 106 during development and provide recommendations to one or more users or, in some examples, update the program code 106 to comply with the development standard.

In some examples, the code development engine 300 can be programmed to receive a build code 302 of the respective build of the program code 106. The code development engine 300 can employ a code evaluation module 304. The code evaluation module 304 can be programmed to communicate with an ML development standard (ML-DS) algorithm 306. The ML-DS algorithm 306 can be trained based on a development standard training data to determine whether the build code 302 complies with a build code development standard. In some examples, the ML-DS algorithm 306 is trained based on build code standards for an entity, a group of users (e.g., developers), a build code environment (e.g., aerial vehicle application(s)). The ML-DS algorithm 306 can be programmed to determine whether the build code 302 complies with the build code development standard based on a library of learned code development standards 308. The library of learned code development standards 308 can characterize the build code development standard. In some examples, the library of learned code development standards 308 can characterize best coding practices, which can include a set of rules for the development of the program code 106. Thus, in some examples, the build code development standard defined by the library of learned code development standards 306 can include specifications for the program code 106, one or more practices, tests, and/or standards for developing the program code 106. In additional examples, the build code development standard defined by the library of learned code development standards 306 can include correct, preferred and/or software development practices for reliability, robustness, security, and/or safety for the program code 106.

The ML-DS algorithm 306 can be programmed to evaluate the build code 302 for coding errors in the build code 302 based on the library of learned code development standards 306. The coding errors can include syntax errors, runtime errors, logic errors, complication errors, arithmetic errors, resource errors, interface errors, functional errors, conflicts, race conditions, variable assignment errors, buffer overruns, and the like. In some examples, the coding errors can include other software errors that can impact the safety of the build code 302 and thus the program code 106. The ML-DS algorithm 306 can be programmed to evaluate the build code 302 for known historical errors and/or undesirable characteristics based on the library of learned code development standards 308. For example, as learning increases, there can be increased knowledge of undesirable characteristics. The build code 302 can be optimized to allow for as much additional bandwidth with respect to CPU utilization as possible. By way of example, code modules with more than one input and/or output can be undesirable. In some examples, user modified configurable parameters related to safety-critical functions should not be allowed unless there are authority limits established and can undesirable. The ML-DS algorithm 306 can be programmed to communicate each identified (e.g., discovered) coding error to the code evaluation module 304 for correction.

In some examples, the code evaluation module 304 can be programmed to communicate with a code update correction (CUC) module 310. The CUC module 310 can be programmed to receive coding error information identifying each discovered coding error in the build code 302. The CUC module 310 can be programmed to communicate with an ML code error correction (ML-CEC) algorithm 316. In some examples, the ML-CEC algorithm 316 can communicate with a library of learned coding error solutions 312. The library of learned coding error solutions 312 can correspond to a library of developed code correction knowledge. Thus, the library of learned coding error solutions 312 can characterize prior error corrective solutions (e.g., updates, changes, modifications, and the like) for coding errors in program and/or build codes.

In some examples, the ML-CEC algorithm 316 can be programmed to identify (e.g., recommend) an error corrective solution for correcting each discovered coding error in the build code 302 based on the library of learned coding corrections 312 to provide the updated build code 314. The CUC module 310 can be programmed to update the build code 302 to correct each discovered error to provide an updated build code 314 based on the identified error corrective solution. Accordingly, discovered coding errors in the build code 302 can be updated by the CUC module 310 based on the error corrective solution recommended by the ML-CEC algorithm 316.

In some examples, if the discovered code error is a new coding error and thus not identified by the library of learned coding error solutions 312, the CUC module 310 can be programmed to alert the user (e.g., on the output device 116) for manual correction of the new coding error. In some examples, the CUC module 310 can be programmed to alert the user on the output device 116 about the error corrective solution for the discovered error, and the user can evaluate the error corrective solution to determine whether the error corrective solution should be used to correct the discovered error or an alternative error corrective solution should be employed. In some examples, the code evaluation module 304 can be programmed to provide the updated build code 314 to the ML-DS algorithm 306. The ML-DS algorithm 306 can be programmed to evaluate the updated build code 314 for additional coding errors. In some examples, the corrected discovered error can cause the updated build code 314 to exhibit additional coding errors. The ML-DS algorithm 306 can be programmed to discover the additional coding errors for correction in a same or similar manner as described herein.

In some examples, the code evaluation module 304 can be programmed to provide an indication to the CUC module 310 whether the discovered coding error has been corrected. For example, if the ML-DS algorithm 306 does not identify the discovered error in the evaluation of the updated build code 314 for the additional coding errors, the CUC module 310 can be programmed to reinforce a learning of the ML-CEC algorithm 316 for future coding error corrections. The CUC module 310 can be programmed to update the library of learned coding error solutions 312 to include the error corrective solution for the discovered coding error, such that the ML-CEC algorithm 316 is re-enforced via unsupervised learning.

In some examples, the code evaluation module 304 can be programmed to communicate the build code 302 to a static code test module 318. The static code test module 318 can be programmed to apply static analysis techniques to examine the build code 302 (e.g., without executing the build code 302). The static code test module 318 can be programmed to evaluate the build code 302 to determine whether the build code 302 includes programming errors, violates coding standards (e.g., whether the build code 302 violates a defined coding format for the build code 302, such as a number indents in various constructs, use of spaces/tabs, and/or the like), has undefined values, syntax violations, security vulnerabilities, and/or the like.

The static code test module 318 can be programmed to communicate to the code evaluation module 304 static-code evaluation coding error information characterizing coding errors in the build code 302 that have been identified based on static-code analysis. The coding errors in the build code 302 that have been identified based on static-code analysis can be referred to as static-identified coding errors. The code evaluation module 304 can be programmed to update the library of learned code development standards 308 based on the static-code evaluation coding error information, such that the library of learned code development standards 308 is re-enforced via unsupervised learning. Thus, the library of learned code development standards 308 can be updated to include static code test rules based on the static-identified coding errors, such that the ML-DS algorithm 306 can be programmed to identify (e.g., discover) the static-identified coding errors in subsequent build code standard development evaluations.

In some examples, the code evaluation module 304 can be programmed to communicate the static-identified coding errors to the CUC module 310. The CUC module 310 can be programmed to employ the ML-CEC algorithm 316 to identify error corrective solutions based on the library of learned coding error solutions 312 to provide the updated build code 314. The CUC module 310 can be programmed to update the build code 302 to correct the static-identified coding errors in the build code 302 to provide the updated build code 314 based on the error corrective solutions. In some examples, the CUC module 310 can be programmed to alert the user on the output device 116 as to the static-identified coding errors and allow the user to modify the build code 302 to correct the static-identified coding errors, and thus provided the updated build code 314. In further examples, the CUC module 310 can be programmed to output on the output device the error corrective solutions to assist the user in correcting the static-identified coding errors.

In some examples, the code evaluation module 304 can be programmed to provide an indication to the CUC module 310 whether the static-identified coding errors in the build code 302 have been corrected. For example, if the ML-DS algorithm 306 does not identify the static-identified coding errors in a subsequent evaluation of the updated build code 314 (e.g., for coding errors), the CUC module 310 can be programmed to reinforce the learning of the ML-CEC algorithm 316. The CUC module 310 can be programmed to update the library of learned coding error solutions 312 to include the static-identified coding errors, such that the learning of the ML-CEC algorithm 316 is re-enforced via unsupervised learning.

In some examples, the code evaluation module 304 can be programmed to communicate the build code 302 to a code coverage test module 320. The code coverage test module 320 can be programmed to apply code coverage analysis techniques to examine the build code 302 to determine an amount of the build code 302 that was exercised or not during execution of the build code 302 based on a test case. Each test case can be stored in a library of learned test cases 322. Each stored test case in the library of learned test cases 322 can identify a specification of inputs, execution conditions, testing procedures, and/or expected results for the build code 302 for achieving a testing objective (e.g., to exercise a particular program path or to verify compliance with a specification requirement). In some examples, the library of learned test cases can include formally defined test cases for verifying that requirements for the build code 302 are met, and/or informally defined test cases for verifying that the build code 302 is operating as expected as build codes of a similar class.

The code coverage test module 320 can be programmed to evaluate (e.g., monitor) the build code 302 during execution according to a respective test case from the library of learned test cases 322. The code coverage test module 320 can be programmed to provide code coverage report data. The code coverage report data can include function coverage information (e.g., how many functions in the build code 302 have been executed), statement coverage information (information e.g., how many statements in the build code 302 have been executed), branches coverage information (e.g., how many branches in the build code 302 have been executed), condition coverage information (e.g., how many of Boolean expressions in the build code 302 have been tested for a true and a false value), line coverage information (e.g., how many lines of code of the build code 302 have been tested), modified condition/decision coverage (MCDC), edge coverage (e.g., how many edges of a control flow graph have been executed) and the like.

The code coverage test module 320 can be programmed to communicate the code coverage report data to the code evaluation module 304. The code evaluation module 304 can be programmed to identify a first set of anomalies (e.g., one or more anomalies) in the build code 302 based on the code coverage report data. The first set of anomalies can be evaluated by the code evaluation module 304 relative to an error-anomaly database to identify the coding errors causing the anomalies in the build code 302. The coding error causing the anomalies in the build 302 can be referred to as code-coverage-identified coding errors.

By way of example, the code evaluation module 320 can be programmed to continuously conduct a "statement coverage" assessment of the build code 302 during development or at any time in an evaluation process when a user makes a request to the system for risk assessment. As the code evaluation module 320 executes a continuously "statement coverage" assessment of the build code 320, dead code may be discovered. The CUC module 310 can be programmed the remove the dead code followed by simulations to assure no functional impact. In some examples, the code evaluation module 320 can be programmed to elect to ensure that there are no jumps into the dead code. The code evaluation module 320 can be programmed to report out to the user via the output device 116 with options to either remove the dead code or retain the dead code based on the confidence that all jumps to the dead code have been eliminated. The code evaluation module 320 can be programmed to memorize the user decision and store this in the library of learned coding error solutions 312. When evaluating future dead code evaluations via statement coverage, the code evaluation module 320 learns that users prefer to remove the dead code as opposed to retaining the code with confidence that jumps have been removed. Therefore the code evaluation module 320 now knows to detect and eliminate dead code as the program code 106 changes (e.g., evolves).

The coding anomaly database can identify anomalies and respective coding errors that can be causing the identified anomalies. The code evaluation module1304 can be programmed to update the library of learned code development standards 308 to include code cover coverage test rules based on the code-coverage-identified coding errors, such that the library of learned code development standards 308 is re-enforced via unsupervised learning. Thus, the ML-DS algorithm 306 can be programmed to identify (e.g., discover) the code-coverage-identified coding errors in build codes (e.g., of the program code or different program codes) based on the cover coverage test rules.

In some examples, the code evaluation module 304 can be programmed to communicate the code-coverage-identified coding errors to the CUC module 310. The CUC module 310 can be programmed to employ the ML-CEC algorithm 316 to identify the error corrective solutions for the code-coverage-identified coding errors based on the library of learned coding corrections 312 to provide the updated build code 314. In some examples, the CUC module 310 can be programmed to alert the user on the output device 116 as to the code-coverage-identified coding errors and allow the user to modify the build code 302 to correct the code-coverage-identified coding errors, and thus provided the updated build code 314. In further examples, the CUC module 310 can be programmed to output on the output device 116 the error corrective solutions to assist the user in correcting the code-coverage-identified coding errors.

In some examples, the code evaluation module 304 can be programmed to provide an indication to the CUC module 310 whether the code-coverage-identified coding errors in the build code 302 have been corrected. For example, if the ML-DS algorithm 306 does not identify the code-coverage-identified coding errors in a subsequent evaluation of the updated build code 314 (e.g., for coding errors), the CUC module 310 can be programmed to reinforce the learning of the ML-CEC algorithm 316. The CUC module 310 can be programmed to update the library of learned coding error solutions 312 to include the code-coverage-identified coding errors, such that the learning of the ML-CEC algorithm 316 is re-enforced via unsupervised learning.

In some examples, the code evaluation module 304 can be programmed to test a behavior of the build code 302 to identify (e.g., discover) coding anomalies in the build code 302. For example, if a code evaluation is for example Safety Critical Code, determinism and timing of outputs can be considered by the code evaluation module 304. As a result, the code evaluation module 304 can be programmed to apply tests and evaluate the results of each test to assure that the deterministic aspects of code output is assured. In another example, if the purpose of the code is target acquisition, accuracy can be considered by the code evaluation module 304. As a result, the code evaluation module 304 can be programmed to assure that the target acquisition has a low level of ambiguity and that the confidence of an accurate target is at an acceptable level.

In some examples, the behavior of the build code 302 can be tested by the code evaluation module 304 based on a test case from the library of learned test cases 322. Based on ML, the code evaluation module 304 can be programmed to understand what tests must be executed to provide confidence to the user that the SW is acceptable safe. Presented with new code that is being evaluated that is associated with target acquisition, the code evaluation module 304 knows based on ML history (e.g., the library of learned test cases 322) that target acquisition systems typically are exposed to a set of tests. The code evaluation module 304 can be programmed to determine that additional tests are necessary to obtain the required confidence level, then these additional tests can be added to the library of learned test cases 322.

The code evaluation module 304 can be programmed to generate test case result data characterizing the behavior of the build code 302 according to the at least one test case. The code evaluation module 304 can be programmed to evaluate the test case result data to identify a second set of anomalies (e.g., one or more anomalies) in the build code 302 based on the test case result data. The second set of anomalies can be evaluated by the code evaluation module 304 relative to the error-anomaly database to identify the coding errors causing the anomalies in the build code 302. The coding errors being caused by the second set of anomalies can be referred to as test-case-identified coding errors.

For example, as tests are introduced and executed, subsequent simulations are conducted to determine the effectiveness of the test by the code evaluation module 304. If a test evolution successfully eliminated some number of detects, then the code evaluation module 304 can know the effectiveness of the test and can apply it as a learned epic and add it to the library of learned test cases 322. If other tests yield no or little benefit, the code evaluation module 304 can be programmed to place these tests on a low priority. As a result, the code evaluation module 304 can be programmed to learn that certain tests provide a large benefit and should be executed with a higher priority than a test will low benefit. In some examples, the code evaluation 304 is programmed to is to execute greatest priority tests first to reduce risk as much as possible and report the results to the user on the output device 116. In some examples, if the user wants even more assurance confidence, then lower priority tests can be executed to eliminate corner case anomalies.

The code evaluation module 304 can be programmed to update the library of learned code development standards 308 based on the test-case-identified coding errors, such that the library of learned code development standards 308 is re-enforced via unsupervised learning. Thus, the library of learned code development standards 308 can be updated to include test case rules based on the test-case-identified coding errors, such that the ML-DS algorithm 306 can be programmed to identify (e.g., discover) the test-case-identified coding errors in subsequent build code standard development evaluations.

In some examples, the code evaluation module 304 can be programmed to communicate the test-case-identified coding errors to the CUC module 310. The CUC module 310 can be programmed to employ the ML-CEC algorithm 316 to identify the error corrective solutions for the test-case-identified coding errors based on the library of learned coding corrections 312 to provide the updated build code 314. In some examples, the CUC module 310 can be programmed to alert the user on the output device 116 as to the test-case-identified coding errors and allow the user to modify the build code 302 to correct the test-case-identified coding errors, and thus provided the updated build code 314. In further examples, the CUC module 310 can be programmed to output on the output device 116 the error corrective solutions to assist in the user in correcting the test-case-identified coding errors.

In some examples, the code evaluation module 304 can be programmed to provide an indication to the CUC module 310 whether the test-case-identified coding errors in the build code 302 have been corrected. For example, if the ML-DS algorithm 306 does not identify the test-case-identified coding errors in a subsequent evaluation of the updated build code 314 (e.g., for coding errors), the CUC module 310 can be programmed to reinforce the learning of the ML-CEC algorithm 316. The CUC module 310 can be programmed to update the library of learned coding error solutions 312 to include the test-case-identified coding errors, such that the learning of the ML-CEC algorithm 316 is re-enforced via unsupervised learning.

In some examples, the code evaluation module 304 can be programmed to communicate with an ML test case generator 324. The ML test case generator 324 can be programmed to recommend the test case for testing the behavior of the build code 302 based on the library of learned test cases 322. The ML test case generator 324 can be programmed to provide the test case to the code evaluation module 304 for testing the behavior of the build code 302 as described herein. Thus, the code evaluation module 304 can be programmed to generate the test case data characterizing the behavior of the build code data 302 according to the respective test case recommended by the ML test case generator 324. The test case identified by the ML test case generator 324 can be employed to test the behavior of the build code 302 to discover the coding anomalies in the build code 302 as described herein. The ML test case generator 324 can be reinforced to identify tests that are more likely to lead to further anomalies in the build code 302. As such, a test recommendation quality of the ML test case generator 324 can be improved following each test recommendation to more effectively identify tests that are more likely to lead to anomalies in the build code 302, thereby increasing the level of acceptability for the program code.

By way of further example, the code evaluation module 304 can be programmed to generate code error correction result data 326. The code error correction data 326 can be indicative of types of coding errors and a number coding errors corrected and/or uncorrected in the build code 302. The code evaluation module 304 can be programmed to communicate the code error correction data 326 to the build code output module 120 for further processing, such as determining an acceptability of the updated build code 314 and thereby the program code 106, as described herein.

Accordingly, the code development engine 300 can be programmed to correct coding errors during the development of the program code 106. In some examples, the code development engine 300 can alert the user on the output device 116 as to the coding errors and provide error corrective solutions for correcting the coding errors in the program code 106. The coding development engine 300 can be configured to assist users (e.g., developers) of the program code 106, such that the program code 106 complies with development standards defined for the program code 106, thereby improving a coding quality of the program code 106. Moreover, by correcting the coding errors in the program code 106 during development, enables early deployment of the program code 106.

Figure 4:
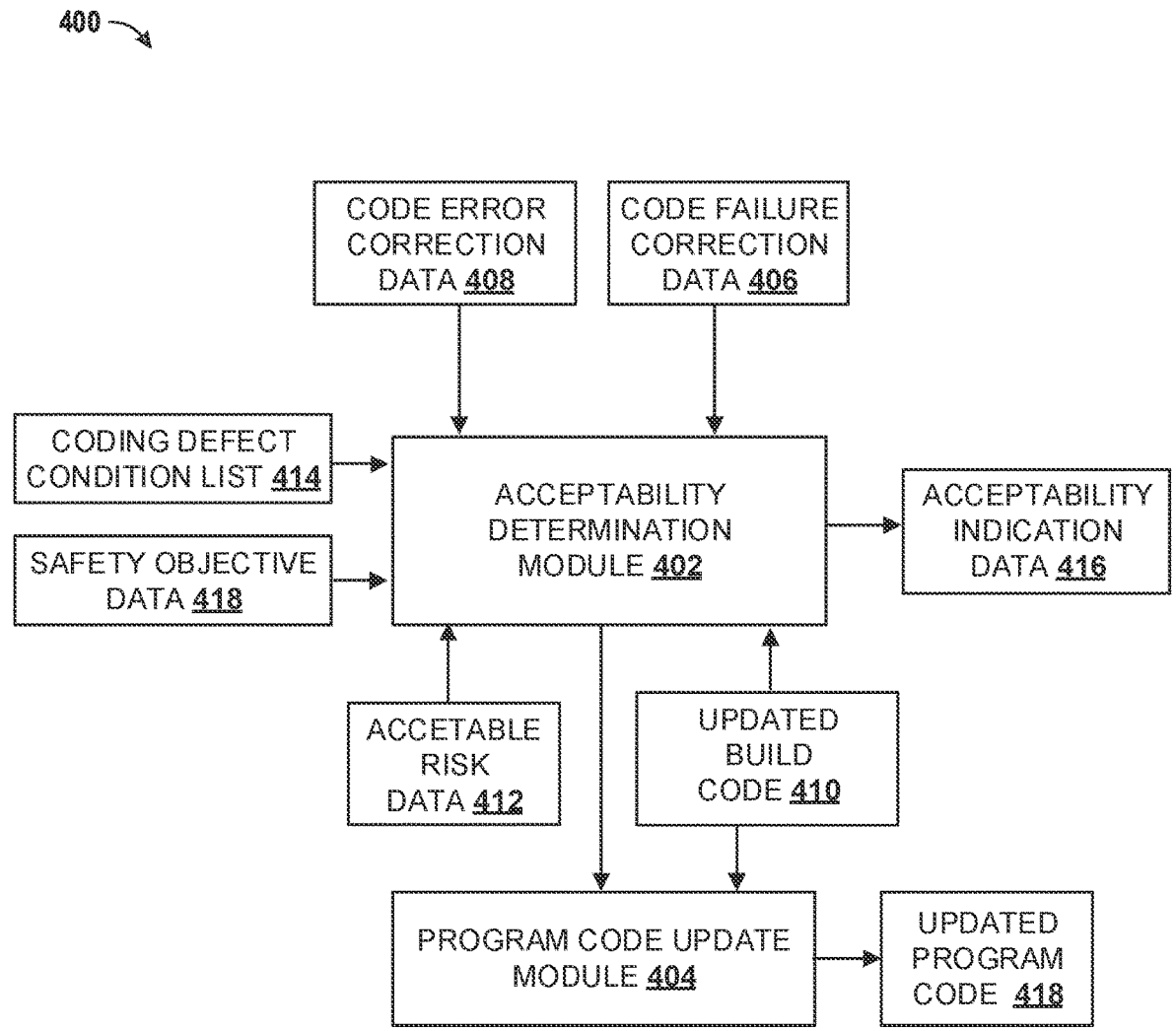
FIG. 4 illustrates an example of a build code output module.

FIG. 4 illustrates an example of a build code output module 400. In some examples, the build code output module 400 can correspond to the build code output module 120, as illustrated in FIG. 1. Therefore, reference can be made to the example of FIGS. 1-3 in the following description of the example of FIG. 4. The build code output module 400 can include an acceptability determination module 402 and a program code update module 404. The acceptability determination module 402 can be programmed to receive code failure correction result data 406 and code error correction result data 408. The code failure correction result data 406 can correspond to the code failure correction result data 240 as illustrated in FIG. 2. The code error correction result data 408 can correspond to the code error correction result data 326, as illustrated in FIG. 3.

The acceptability determination module 402 can be programmed to evaluate an updated build code 410 to determine whether the updated build code 410 is acceptable (e.g., safer for use) for deployment. The updated build code 410 can correspond to the updated build code 118, as illustrated in FIG. 1. Thus, in some examples, the updated build code 410 can include changes to the build code 112 made by the code development engine 114 and/or the code run-time simulation engine 122, as illustrated in FIG. 1. In some examples, the updated build code 410 can correspond to the updated build code 234, as illustrated in FIG. 2 or the updated build code 314, as illustrated in FIG. 3. The acceptability determination module 402 can be programmed to receive acceptable risk data 412. The acceptable risk data 412 can indicate a level of risk that a user has determined as acceptable for the updated build code 410. For example, the level of risk can correspond to a value or a probability that the user has deemed as acceptable for the updated build code 410.

In some examples, the acceptability determination module 402 can be programmed to update a code acceptability reference threshold based on a type of coding defect (e.g., failure and/or error) that was discovered and whether the identified coding defect in the build code 202 have been corrected based on the code failure correction data 406 and/or the code error correction data 408. The acceptability determination module 402 can be programmed to evaluate the type of coding defect relative to a coding defect condition list 414 to identify a respective coding defect value. The acceptability determination module 402 can be programmed to update the code acceptability reference threshold based on the respective code defect value. In some examples, the coding defect condition list 414 can include categories relating to types of coding defects and associate each category coding defect with a coding defect value.

By way of example, the coding defect condition list 414 can include a catastrophic failure category, a hazardous failure category, a major failure category, a minor category failure, and/or a no-effect failure category. The catastrophic failure category can correspond to catastrophic failures in a respective build code that can cause a crash or loss of life. The hazardous failure category can correspond to hazardous failures in the respective build code that can reduce an ability of a system (e.g., an aerial vehicle) or an operator of the system to operate properly and thus impacts the safety or at least a performance of the system. The major failure category can correspond to major failures in the respective build code that can have less impact than hazardous failures but can be significant in nature or at least significantly reduce the functionality of the system. The minor failure category can correspond to minor failures in the corresponding build code that can have a lesser impact than the major failure to the system, however, is noticeable in the performance of the system. The no-effect failure category can correspond to no-effect failures that have no effect on the safety of the system, operation of the system, or workload of system operators.

As described above, each category failure type is associated with a coding defect value. Failure categories that have a greater impact on the safety of the system (e.g., the aerial vehicle) can have a greater failure value than failure categories that have a reduced impact on the safety of the system. For example, the coding defect value for the catastrophic failure category can be greater than the coding defect value for the hazardous failure category, which can be greater than the coding defect value for the major failure category. The major failure category can have a greater coding defect value than the minor category failure, which has a greater coding defect value than the no-effect failure category. In some examples, the coding defect condition list 414 can include a logical error failure category, a syntax failure category, a semantic error category, a runtime failure category, and/or similar error coding categories, and each of these categories can be associated with a respective coding defect value.

In some examples, the acceptability determination module 402 can be programmed to update the code acceptability reference threshold to a new value-based on coding defect values from the coding defect condition list 414. The updating of the code acceptability reference threshold can include multiplying, dividing, subtracting, or adding the coding defect values to the code acceptability reference threshold to provide an updated code acceptability reference threshold. For example, as catastrophic, hazardous, and/or major failures in the build code 112 are corrected to provide the updated build code 410, the code acceptability reference threshold can be updated to reflect an acceptability of the updated build code 410. In some examples, the code acceptability reference threshold can be equal to or greater than the level of risk that the user has determined as acceptable for the updated build code 410 as defined by the acceptable risk data 412. The acceptability determination module 402 can be programmed to provide acceptability indication data 416 indicating that the updated build code 410 is acceptable for use in the program code environment, such as a safety-critical application. The acceptability determination module 402 can be programmed to communicate the acceptability indication data 416 to the output device 116 to alert the user that the updated build code 410 corresponding to the respective build of the program code 106 is acceptable for use (e.g., safer for use).

In some examples, the acceptability determination module 402 can be programmed to receive safety objective data 418. The acceptability determination module 402 can be programmed to compute a risk probability that the updated build code 410 complies with safety requirements or objectives for the program code 106 based on the safety objective data 418. In some examples, the acceptability determination module 402 can be programmed to evaluate the updated build code 410 for compliance with safety or objectives for the program code 106 based on the safety objective data 418. The acceptability determination module 402 can be programmed to evaluate the risk probability relative to the level of acceptable risk defined by the user and/or entity to determine whether the updated build code 410 is acceptable. In some examples, the acceptability determination module 402 can be programmed to alert the user on the output device 116 that the updated build code 410 is acceptable corresponding to the respective build of the program code 106. In some examples, the acceptability determination module 402 can be programmed to provide on the output device 116 the risk probability as the acceptability indication data 416 to provide the user an indication of safety risk of the updated build code 410.

In some examples, the acceptability determination module 402 can be programmed to communicate with the program code update module 404 to modify the program code 106 to provide updated program code 410. The program code update module 404 can be programmed to employ the updated build code 410 to update the program code model 110 or the program code 106. Thus, as the coding errors are corrected by the code development engine 114 to provide the updated build code 410, the program code update module 404 can be programmed to update the program code model 110 or the program code 106 to correct these coding errors in the program code 106. In some examples, as coding failures are corrected by the code run-time simulation engine 122 to provide the updated build code 410, the program code update module 404 can be programmed to update the program code model 110 or the program code 106 to correct the program code 106 for the these coding failures in the program code 106. In some examples, the program code update module 404 can be programmed to provide the updated build code 410 as the updated program code 410 (e.g., to the user). Thus, the program code update module 404 can be programmed to interface with a development system to provide the updated program code 410.

Accordingly, the build code output module 400 can be programmed to determine whether the updated build code 410 is acceptable, and thus safer for use, in some examples, in safety-critical applications. In some examples, the build code output module 400 can be programmed to update the program code 106 as one or more users are developing the program code 106 to correct defects (e.g., failures and/or errors) in the program code 106 identified by the code development engine 114 and/or the code run-time simulation engine 122, thereby improving a program code quality (e.g. a functional and structural quality of the program code 106).

Figure 5:
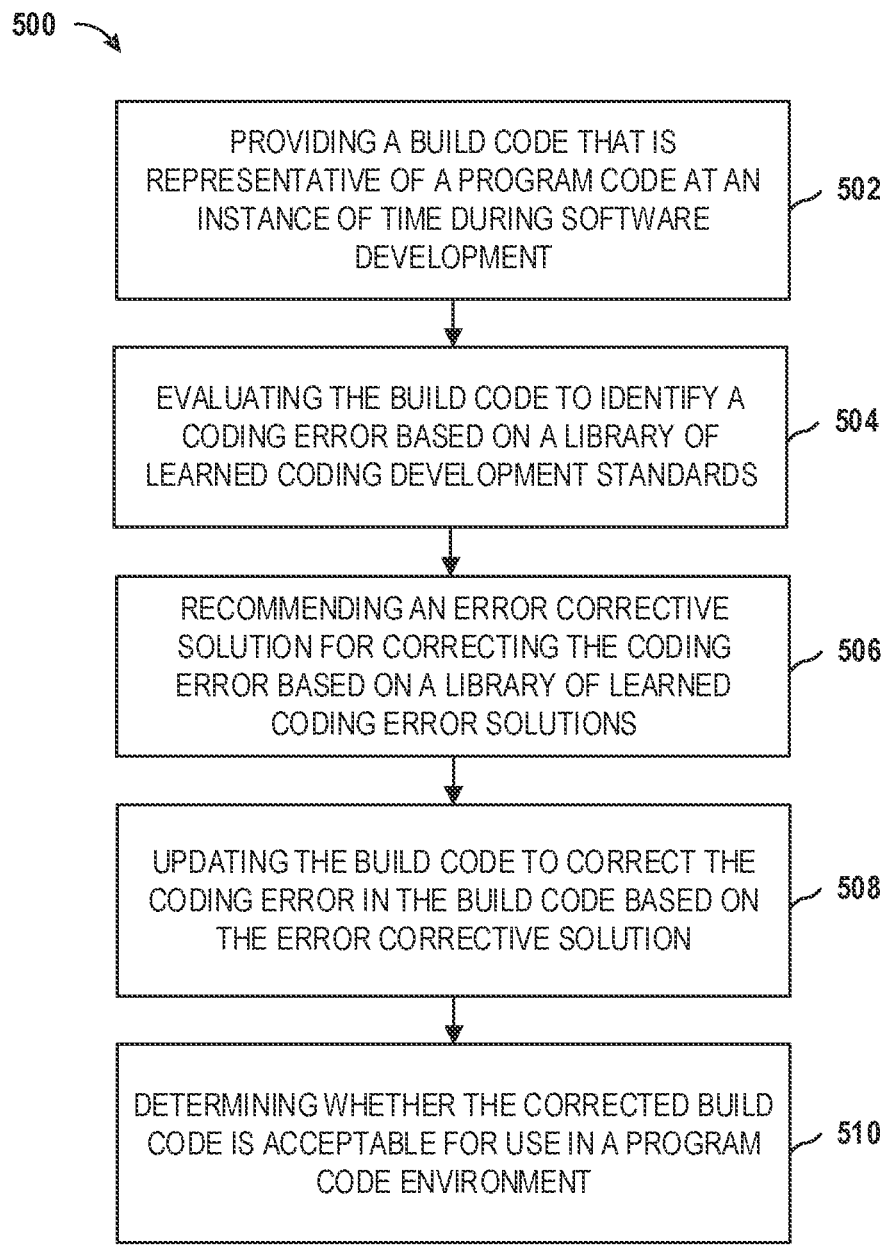
FIG. 5 illustrates an example of a method for program error correction and acceptability determination.
Figure 6:
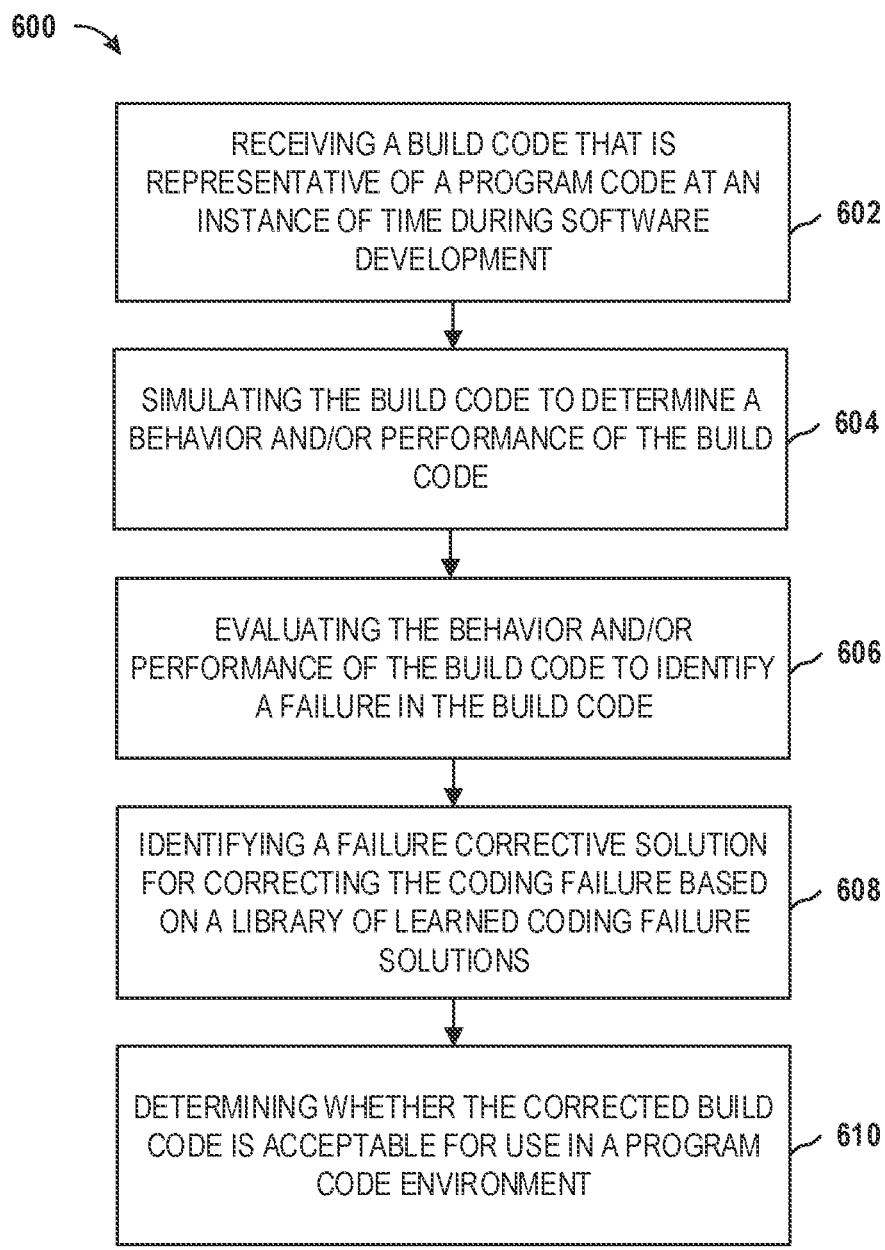
FIG. 6 illustrates an example of a method for program error correction and acceptability determination.

In view of the foregoing structural and functional features described above, example methods will be better appreciated with reference to FIGS. 5-6. While, for purposes of simplicity of explanation, the example methods of FIGS. 5-6 are shown and described as executing serially, it is to be understood and appreciated that the example methods are not limited by the illustrated order, as some actions could in other examples occur in different orders, multiple times and/or concurrently from that shown and described herein.

FIG. 5 illustrates an example of a method 500 for program error correction and acceptability determination. The method 500 can be implemented by the system 100, as illustrated in FIG. 1. Therefore, reference can be made to the examples of FIGS. 1-3 in the following description of the example of FIG. 5. The method 500 can begin at 502 by providing build code (e.g., the build code 112, as illustrated in FIG. 1) that can be representative of program code (e.g., the program code 106, as illustrated in FIG. 1) at an instance of time during a software development of the program code. At 504, the build code can be evaluated (e.g., by the coding development engine 114, as illustrated in FIG. 1) to identify a coding error in the build code based on a library of learned coding development standards (e.g., the library of learned coding development standards 308, as illustrated in FIG. 3). The library of learned coding developments standards can characterize rules and/or constraints for the software development of the program code.

At 506, an error corrective solution for correcting the coding error can be recommended (e.g., by the ML-CEC algorithm 316, as illustrated in FIG. 3) based on an evaluation of the coding error and a library of learned coding error solutions (e.g., the library of learned coding error solutions 312, as illustrated in FIG. 3). The library of learned coding error solutions can characterize prior error corrective solutions for coding errors in program and/or build codes. At 508, the build code can be updated (e.g., by the CUC module 310, as illustrated in FIG. 3) to correct the coding error in the build code based on the error corrective solution. At 510, a determination can be made (e.g., by the acceptability determination module 402, as illustrated in FIG. 4) as to whether the build code is acceptable for use in a program code environment for the program code based on a level of acceptable risk (e.g., as defined by the acceptable risk data 412, as illustrated in FIG. 4) for the build code in response to correcting the coding error in the build code.

FIG. 6 illustrates an example of a method 600 for program error correction and acceptability determination. The method 600 can be implemented by the system 100, as illustrated in FIG. 1. Therefore, reference can be made to the examples of FIGS. 1-4 in the following description of the example of FIG. 6. The method 600 can begin at 602 by receiving (e.g., at a code run-time simulation engine 122, as illustrated in FIG. 1) build code that can be representative of program code (e.g., the program code 106, as illustrated in FIG. 1) at an instance of time during or after software development of the program code. The build code can correspond to the build code 112, as illustrated in FIG. 1. At 604, the build code can be simulated (e.g., by at least one of the nominal simulation module 206, the stress simulation module 208, and/or the non-nominal simulation module 210) in a modeled program code environment of a program code environment for the program code to determine a behavior and/or performance of the build code.

At 606, the behavior and/or performance of the build code can be evaluated (e.g., by the CRC module 204, as illustrated in FIG. 1) to identify a coding failure in the build code. At 608, a failure corrective solution can be identified (e.g., by the ML-CFC algorithm 236, as illustrated in FIG. 2) for correcting the coding failure based on an evaluation of the coding failure and a library of learned coding failure solutions characterizing prior failure corrective solutions for coding failures in program and/or build codes. The library of learned coding failure solutions can correspond to the library of learned coding failure solutions 232, as illustrated in FIG. 2. At 610, the method 600 can include determining (e.g., via acceptability determination module 402, as illustrated in FIG. 4) whether the build code is acceptable for use in the program code environment based on a level of acceptable risk (e.g., as defined by the acceptable risk data 412, as illustrated in FIG. 4) for the build code in response to correcting the coding failure in the build code.

What has been described above are examples. It is, of course, not possible to describe every conceivable combination of components or methodologies, but one of ordinary skill in the art will recognize that many further combinations and permutations are possible. Accordingly, the disclosure is intended to embrace all such alterations, modifications, and variations that fall within the scope of this application, including the appended claims. As used herein, the term "includes" means includes but not limited to, the term "including" means including but not limited to. The term "based on" means based at least in part on. Additionally, where the disclosure or claims recite "a," "an," "a first," or "another" element, or the equivalent thereof, it should be interpreted to include one or more than one such element, neither requiring nor excluding two or more such elements.

What is claimed is:

1. A computer-implemented method comprising:
providing build code that is representative of program code at an instance of time during a software development of the program code;
evaluating the build code to identify a coding error in the build code based on a library of learned coding development standards characterizing rules and/or constraints for the software development of the program code;
simulating the build code in a modeled program code environment for the program code that applies nominal, off-nominal and stress conditions to the build code based on simulation parameters, the simulation parameters being recommended by a machine learning (ML) simulation parameter algorithm based on a library of learned simulation parameters, the library of learned simulation parameters characterizing prior simulation parameters for configuring parameters of the modeled program code environment;
recommending an error corrective solution for correcting the coding error based on an evaluation of the coding error and a library of learned coding error solutions characterizing prior error corrective solutions for coding errors in program and/or build codes; and
updating the build code to correct the coding error in the build code based on the error corrective solution; and
determining whether the build code is acceptable for use in a program code environment for the program code based on a level of acceptable risk for the build code in response to correcting the coding error in the build code.

2. The computer-implemented method of claim 1, wherein determining whether the build code is acceptable for use in the program code environment comprises evaluating code error correction result data based on the level of acceptable risk for the build code to determine whether the build code is acceptable for use in the program code environment, Wherein the code error correction result data is indicative of types of coding errors and a number coding errors corrected and/or uncorrected in the build code.

3. The computer-implemented method of claim 2, further comprising:
applying static analysis techniques to evaluate the build code to determine whether the build code contains a second coding error, wherein the coding error is a first coding error; and
recommending a second error corrective solution for correcting the second coding error based on an evaluation of the second coding and the library of learned coding error solutions, wherein the error corrective solution is a first error corrective solution; and
updating the build code to correct the second coding error in the build code based on the second error corrective solution.

4. The computer-implemented method of claim 3, further comprising:
applying code coverage analysis techniques to evaluate the build code to determine an amount of the build code that was exercised or not exercised during an execution of the build code based on a test case to provide code coverage report data; and
identifying an anomaly in the build code based on the code coverage report data; and
identifying a third coding error in the build code based on an evaluation of the identified anomaly and an error-anomaly database; and
recommending a third error corrective solution for correcting the third coding error based on an evaluation of the third coding error and the library of learned coding error solutions; and
updating the build code to correct the third coding error in the build code based on the third error corrective solution.

5. The computer-implemented method of claim 4, further comprising:
outputting simulation result data characterizing a behavior and/or performance of the build code based on the simulation of the build code in the modeled program code environment;
evaluating the simulation result data to identify a coding failure in the build code;
identifying using the ML techniques a failure corrective solution for correcting the coding failure based on an evaluation of the coding failure and a library of learned coding failure solutions characterizing prior failure corrective solutions for coding failures in the program and/or build codes, wherein the determination of whether the build code is acceptable for use in the program code environment is response to correcting the coding error and coding failure in the build code.

6. A system comprising:
memory to store machine readable instructions and data, the data comprising build code that is representative of program code at an instance of time; and
one or more processors to access the memory and execute the machine readable instructions, the machine readable instructions comprising:
a code development engine programmed to evaluate the build code to determine whether the build code complies with a program code development standard for the program code to identify a coding error in the build code, the code development engine being programmed to recommend an error corrective solution for correcting the build code for the coding error;
a code run-time simulation engine programmed to simulate the build code in a modeled program code environment for the program code that applies nominal, off-nominal and stress conditions to the build code to identify a coding failure in the build code, the code run-time simulation engine being programmed to recommend a failure corrective solution for correcting the build code for the coding failure, wherein the modeled program code environment includes an operating system and an application layer; and
a build code output module being programmed to evaluate the build code to determine whether the build code is acceptable for use in a program code environment based on a level of acceptable risk for the build code in response to the coding error and/or coding failure being corrected in the build code.

7. The system of claim 6, wherein the coding development engine comprises:
- a machine learning development standard (ML-DL) algorithm programmed to identify the coding error in the build code based on a library of learned coding development standards characterizing rules and/or constraints for the software development of the program code;
- a ML code error correction (ML-CEC) algorithm that is programmed to recommend the error corrective solution for correcting the coding error based on a library of learned coding error solutions characterizing prior error corrective solutions for coding errors in program and/or build codes; and
- a code update correction (CLC) module programmed to correct the coding error in the build code based on the error corrective solution.

8. The system of claim 7, wherein the coding development engine further comprises a static code test module programmed to apply static analysis techniques to evaluate the build code to determine whether the build code contains a second coding error, wherein the coding error is a first coding error, and the ML-CEO algorithm being programmed to recommend a second error corrective solution for correcting the second coding error based on an evaluation of the second coding error and the library of learned coding error solutions, and the CUC module is programmed to correct the second coding error in the build code based on the second error corrective solution.

9. The system of claim 8, wherein the coding development engine further comprises:
- a code coverage test module programmed to apply code coverage analysis techniques to evaluate the build code to determine an amount of the build code that was exercised or not exercised during an execution of the build code based on a test case to provide code coverage report data; and
- a code evaluation module programmed to identify an anomaly in the build code based on the code coverage report data, and further being programmed to identify a third coding error in the build code based on an evaluation of the identified anomaly and an error-anomaly database.

10. The system of claim 9, wherein the ML-CEC algorithm is programmed to recommend a third error corrective solution for correcting the third coding error based the library of learned coding error solutions, and the CUC module is programmed to correct the third coding error in the build code based on the third error corrective solution.

11. The system of claim 10, wherein the coding development engine further comprises a machine learning (NIL) test case generator trained based on test case training data characterizing previous test cases employed to test behaviors of prior program and/or build codes, the ML test case generator being programmed to provide the test case.

12. The system of claim 11, wherein the code run-time simulation engine comprises at least one simulation module, the at least one simulation module being programmed to:
- generate a modeled program code environment of the program code environment for the program code based on simulation parameters;
- simulate the build code in the modeled program code environment; and
- output simulation result data characterizing a behavior and/or performance of the build code based on the simulation of the build code in the modeled program code environment.

13. The system of claim 12, wherein the code run-time simulation engine comprises a ML simulation parameter algorithm programmed to recommend the simulation parameters for the at least one simulation module to configure the modeled program code environment for simulation based on a library of learned simulation parameters, the library of learned simulation parameters characterizing prior simulation parameters for configuring modeled program code environments, and
wherein the code run-time simulation engine further comprises a code run-time process and control module programmed to evaluate simulation result data generated by the at least one simulation module to identify the coding failure in the build code.

14. The system of claim 13, wherein the code run-time simulation engine further comprises:
- a ML code failure correction (ML-CFC) algorithm programmed to recommend the failure corrective solution for correcting the coding failure based on a library of learned coding failure solutions characterizing prior failure corrective solutions for coding failures in the program and/or build codes; and
- a code failure update (CFU) module programmed to correct the coding failure in the build code based on the failure corrective solution.

15. The system of claim 14, wherein one of the code run-time process and control module and the code evaluation module is programmed to generate code defect correction result data indicative of a type of coding defects and a number coding defects corrected and/or uncorrected in the build code, and the build code output module comprises an acceptability determination module programmed to evaluate the code defect correction result data based on the level of acceptable risk for the build code to determine whether the build code is acceptable for use in the program code environment.

16. The system of claim 15, wherein one of:
the build code is one of evaluated by the coding development engine and simulated by the code run-time simulation engine as the program code is being developed;
the build code is one of evaluated by the coding development engine and simulated by the code run-time simulation engine based on user-defined changes to the program code; and
the program code corresponds to legacy program code.

17. The system of claim 16, wherein the machine readable instructions further comprise an environment interface module programmed to receive or retrieve a released program code corresponding to an acceptable version of the build code, and the code run-time simulation engine is programmed to simulate the released program code in the modeled program code environment to identify a further coding failure in the build code, the code run-time simulation engine being programmed to recommend another failure corrective solution for correcting the released program code for the other coding failure, and the build code output module is programmed to evaluate the released program code to determine whether the released program code is acceptable for use in the program code environment.

* * * * *